(12) United States Patent
Miglani et al.

(10) Patent No.: US 9,207,404 B2
(45) Date of Patent: Dec. 8, 2015

(54) COMPOUND OPTICAL CIRCUIT SWITCH

(71) Applicant: CALIENT Technologies, Inc., Goleta, CA (US)

(72) Inventors: Jitender Miglani, Hollis, NH (US); Mike Deacon, Ventura, CA (US); Vijayan Thattai, Goleta, CA (US)

(73) Assignee: CALIENT Technologies, Inc., Goleta, CA (US)

( * ) Notice: Subject to any disclaimer, the term of this patent is extended or adjusted under 35 U.S.C. 154(b) by 104 days.

(21) Appl. No.: 14/046,825

(22) Filed: Oct. 4, 2013

(65) Prior Publication Data

US 2015/0098678 A1 Apr. 9, 2015

(51) Int. Cl.
*G02B 6/35* (2006.01)

(52) U.S. Cl.
CPC ............ *G02B 6/3546* (2013.01); *G02B 6/3512* (2013.01); *G02B 6/3588* (2013.01)

(58) Field of Classification Search
CPC .............................. G02B 6/3546; G02B 6/3588
See application file for complete search history.

(56) References Cited

U.S. PATENT DOCUMENTS

| | | | |
|---|---|---|---|
| 5,037,173 A | 8/1991 | Sampsell et al. | |
| 5,325,089 A * | 6/1994 | Goeldner | 340/2.25 |
| 6,097,860 A | 8/2000 | Laor | |
| 6,411,751 B1 | 6/2002 | Giles et al. | |
| 6,456,751 B1 | 9/2002 | Bowers et al. | |
| 6,567,574 B1 | 5/2003 | Ma et al. | |
| 6,628,041 B2 | 9/2003 | Lee et al. | |
| 6,690,885 B1 | 2/2004 | Aksyuk et al. | |
| 6,785,438 B2 * | 8/2004 | Lin et al. | 385/16 |
| 6,798,992 B1 | 9/2004 | Bishop et al. | |
| 6,819,815 B1 | 11/2004 | Corbalis et al. | |
| 6,823,101 B2 | 11/2004 | Gates, II et al. | |
| 6,836,381 B2 | 12/2004 | Giles et al. | |
| 7,676,125 B2 | 3/2010 | Zheng et al. | |
| 9,008,510 B1 * | 4/2015 | Zhao et al. | 398/45 |

\* cited by examiner

*Primary Examiner* — Omar R Rojas
(74) *Attorney, Agent, or Firm* — SoCal IP Law Group LLP; John E. Gunther; Steven C. Sereboff

(57) ABSTRACT

A compound optical circuit switches and methods are disclosed. Two or more $1^{st}$-tier switches may be coupled to one or more $2^{nd}$-tier switches. Each of a plurality of input ports may be connected to a respective input of one of the $1^{st}$-tier switches and each of a plurality of output ports may be connected to a respective output of one of the $1^{st}$-tier switches. Each connection between an input port and an output port connected to the same $1^{st}$-tier switch may be made within the $1^{st}$-tier switch. Each connection between an input port and an output port connected to two different $1^{st}$-tier switches is made along a respective connection path through the $1^{st}$-tier switch connected to the input port, through a selected $2^{nd}$-tier switch, and through the $1^{st}$-tier switch connect to the output port.

11 Claims, 14 Drawing Sheets

US 9,207,404 B2

COMPOUND OPTICAL CIRCUIT SWITCH

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to optical communications networks and more particularly to optical circuit switches using MEMS (micro-electromechanical system) mirror arrays.

2. Description of the Related Art

Communications networks commonly contain a mesh of transmission paths which intersect at hubs or nodes. At least some of the nodes may include a switching device that receives data or information arriving at the node and retransmits the information along appropriate outgoing paths.

Optical fiber links are commonly used to provide high bandwidth transmission paths between nodes. Such optical fiber links form the backbone of wide area networks such as the Internet. Optical fiber links are also applied in high bandwidth local area networks which may be used, for example, to connect server racks in large data centers or to connect processors in high performance computers.

An optical circuit switch is a switching device that forms connections between pairs of optical fiber communications paths. A typical optical circuit switch may have a plurality of ports and be capable of selectively connecting any port to any other port in pairs. Since an optical circuit switch does not convert information flowing over the optical fiber communication paths to electrical signals, the bandwidth of an optical circuit switch is essentially the same as the bandwidth of the optical communications paths. Further, since an optical circuit switch does not convert information into electrical signals, the power consumption of an optical circuit switch may be substantially lower than a comparable conventional (i.e. electronic) switch.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
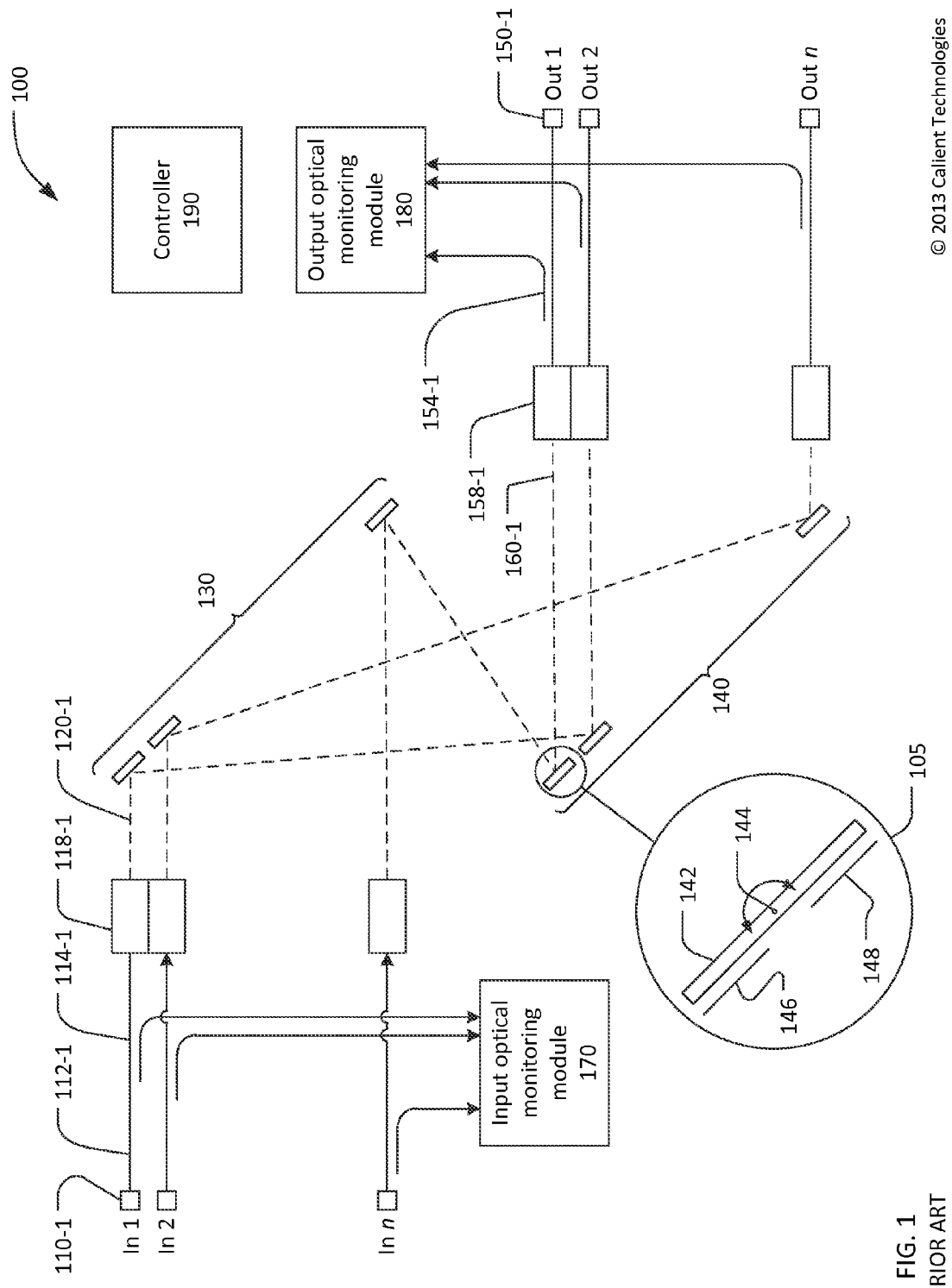
FIG. 1 is an optical schematic diagram of an optical circuit switch.

Referring now to FIG. 1, an exemplary optical circuit switch 100 may be configured to connect a group of n inputs (where n is an integer greater than 1), labeled In 1 to In n, to a group of n outputs, labeled Out 1 to Out n. More specifically, the optical circuit switch 100 may selectively connect up to n pairs of inputs and outputs.

Each of the inputs In 1 to In n may include a connector (of which only the connector 110-1 is identified) to receive an input optical signal from a optical fiber cable (not shown) external to the optical circuit switch. Each connector may be coupled by a respective optical fiber (of which only optical fiber 112-1 is identified) to a respective tap coupler (of which only tap coupler 114-1 is identified). Each tap coupler may extract an input sample portion, for example 1% to 10%, of the input optical signal from the respective optical fiber. Each input sample portion may be directed to an input optical monitoring module 170. The remainder of the input optical signals, other than the input sample portions, may be conveyed by respective optical fibers to respective collimator lenses (of which only collimator lens 118-1 is identified). Each collimator lens may convert the input optical signal from the respective optical fiber into a collimated input optical beam (of which only input optical beam 120-1 is identified) in free space. Free space optical beams are shown in FIG. 1 as dashed lines.

Each input optical beam, such as input optical beam 120-1, may be directed onto a first mirror array 130. The first mirror array 130 may include n mirrors with a one-to-one correspondence between input optical beams and mirrors, such that each input optical beam is directed onto a respective mirror. To improve the manufacturing yield of the first mirror array, the first mirror array 130 may include more than n mirrors, in which case the n input optical beams may be directed to a subset of n mirrors that are known to be fully functional. Since each of the n input optical beams originates from a specific port and is directed onto a specific mirror, each port may be described as "uniquely associated" with a corresponding mirror. In this patent, "uniquely associated" means a one-to-one correspondence. To take advantage of the available fully functional mirrors, the associations between ports and mirrors may be different in different optical circuit switches.

Each mirror on the first mirror array 130 may reflect the respective input optical beam to a selected mirror of a second mirror array 140. The mirrors of the second mirror array 140 may reflect the incident beam to form a respective output optical beam (of which only output optical beam 160-1 is identified). Each output optical beam may be directed to a corresponding focusing lens (of which only focusing lens 158-1 is identified). Each focusing lens may focus the respective output optical beam into an output optical signal in a respective optical fiber. Each output optical signal may be conveyed to a respective output tap coupler (of which only output tap coupler 154-1 is identified). Each output tap coupler may direct a sample portion (for example 1% to 10%) of the respective output optical signal to an output optical monitoring module 180. The remainder of each output optical signal, other than the respective sample portion, may be conveyed to a respective output connector (of which only connector 150-1 is identified).

The input optical monitoring module 170 and the output optical monitoring module 180 may be a common module. The input optical monitoring module 170 and the output optical monitoring module 180 may measure the optical power in each of the input sample portions and output sample portions, respectively. Each of the input optical monitoring module 170 and the output optical monitoring module 180 may include an optical power detector for each sample portion. Alternatively, each of the input optical monitoring module 170 and the output optical monitoring module 180 may time-multiplex a single detector or an array of detectors such that each detector measures the optical power of sequence of sample portions. For example, each of the input optical monitoring module 170 and the output optical monitoring module 180 may use a scanning mirror to direct sample portions to a single detector or an array of detectors as described in U.S. Pat. No. 7,676,125.

Sample portions may be extracted from the input optical beams, such as input optical beam 120-1, and/or the output optical beams, such as output optical beam 160-1, using one or more free space sampling optical elements. For example, sample portions may be extracted as described in U.S. Pat. No. 6,597,825 or U.S. Pat. No. 6,668,118. Input tap couplers, such as input tap coupler 114-1 and/or output tap couplers, such as output tap coupler 154-1, may not be present when free-space sampling optical elements are used to extract sample portions.

The optical circuit switch 100 may include a controller 190. The controller 190 may control the mirror elements in the first mirror array 130 and the second mirror array 140 to make desired optical connections between the input In 1 to In n and the outputs Out 1 to Out n. For example, as shown in FIG. 1, input In 1 is connected to output Out 2, input In 2 is connected to output Out n, and input In n is connected to output Out 1. The controller 190 will be discussed in greater detail subsequently.

The detail view 115 shows a simplified schematic diagram of a mirror element from either the first mirror array 130 or the second mirror array 140. A reflective mirror element 142 is supported by a pair of torsion bars, of which only a first torsion bar 144 is visible. The second torsion bar is located on the far side of the mirror element 142 and axially aligned with the first torsion bar 144. The mirror element 142 may rotate about the axis of the torsions bars, with the torsion bars providing a spring force tending to return the mirror element 142 to a default position. The mirror element 142 may be coupled to a first electrode 146 and a second electrode 148. The mirror element 142 may be rotated by electrostatic attraction between the mirror element and either the first electrode 146 or the second electrode 148.

For example, applying a voltage between the first electrode 146 and the mirror element 142 will create an attraction between the mirror element and the first electrode, causing the mirror element to rotate in a counter-clockwise direction. The mirror will rotate until the return force of the torsion bars is equal to the force of the electrostatic attraction. The angular rotation of the mirror element 142 may be approximately proportional to the square of the voltage between the first electrode 146 and the mirror element 142. Similarly, applying a voltage between the second electrode 148 and the mirror element 142 will cause the mirror to rotate in a clockwise direction. The first electrode 146 and the second electrode 148 may be "dedicated" to the mirror element 142, which is to say the only function of the electrodes 146 and 148 is to rotate the mirror element 142 and the voltages applied to the electrodes 146 and 148 have no effect on any mirror element other than the mirror element 142.

In the simplified example of FIG. 1, the mirror element 142 rotates about a single axis defined by the torsion bars 144. Either or both of the first mirror array 130 and the second mirror array 140 may include mirrors configured to independently rotate about two orthogonal axes. In this case, each mirror element may be coupled to a first pair of electrodes to cause clockwise and counter-clockwise rotation about a first axis and a second pair of electrodes to cause clockwise and counter-clockwise rotation about a second axis orthogonal to the first axis. The structure of a mirror array and the associated electrodes may be substantially more complex than that shown in the simplified schematic detail view 115. For example, U.S. Pat. No. 6,628,041 describes a MEMS mirror array having two-axis mirror motion and comb actuators.

Figure 2:
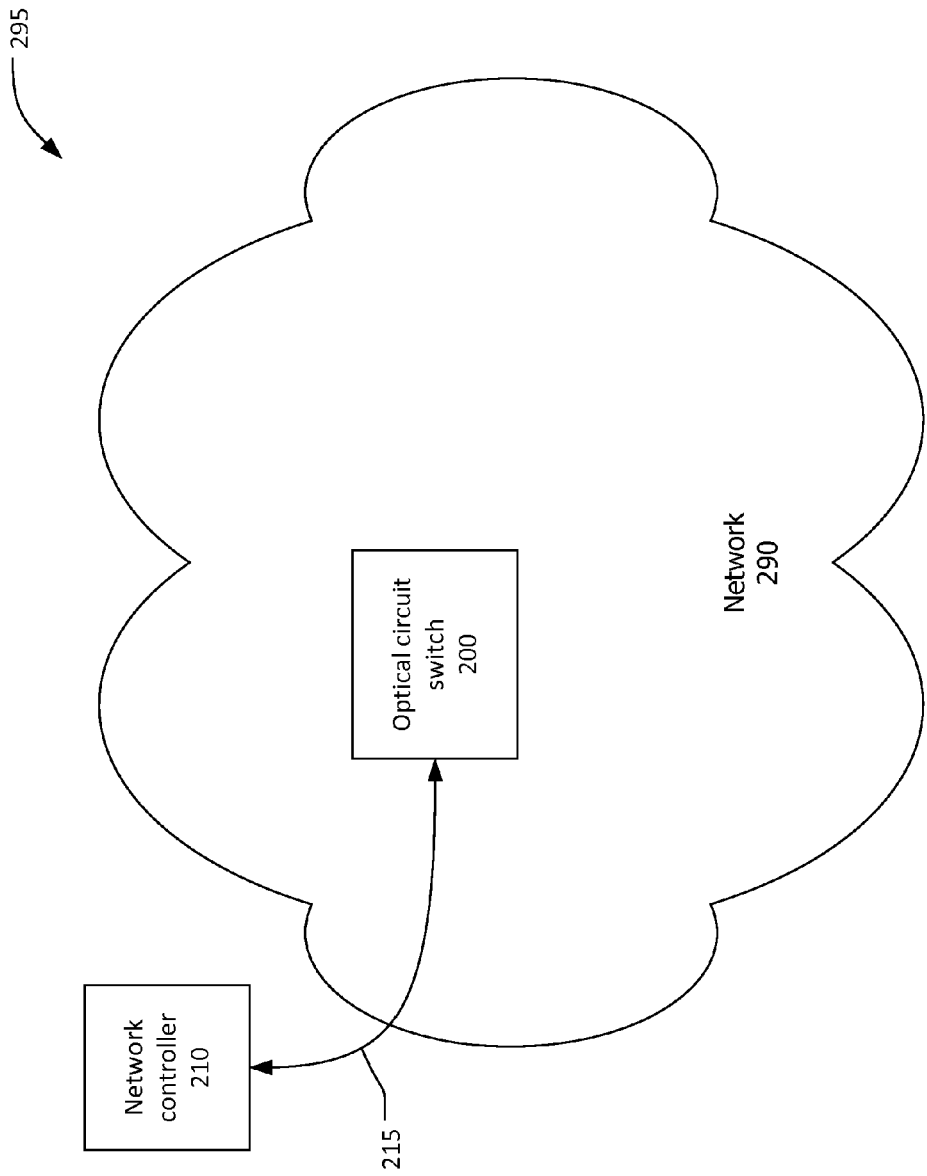
FIG. 2 is a block diagram of an environment for an optical circuit switch.

Referring now to FIG. 2, an environment 295 for the application of an optical circuit switch 200 may include a network 290 and a network controller 210. The optical circuit switch 200 may be the optical circuit switch 100 or may be a compound optical circuit switch including multiple copies of the optical circuit switch 100. When the optical circuit switch 200 is a compound optical circuit switch, the multiple copies of the optical circuit switch 100 may be collocated or distributed. The optical circuit switch 200 may be disposed within the network 290 and may function to switch optical connections between other nodes (not shown) within the network 290. The network 290 may be, for example, a wide area network, a local area network, a storage area network, a private network within a data center or computer cluster, and may be or include the Internet. While the connections switched by the optical circuit switch 200 are optical, other connections within the network 290 may be wired and/or wireless.

The network controller 210 may be a computing device that provides a graphic user interface or a command line interface for a network operator to enter connection commands (i.e. commands to make or break one or more optical connections) for the optical circuit switch 200. The network controller 210 may be a computing device running network management software, in which case connection commands for the optical circuit switch 200 may be generated automatically by the network controller 210.

A communications link 215 between the optical circuit switch 200 and the network controller 210 may be in-band, which is to say the communications link 215 may be a path within the network 290. In this case, the optical circuit switch may have a wired, wireless, or optical connection to the network in addition to the optical connections being switched. The communications link 215 may be out-of-band, which is to say the communications link 215 may be a dedicated connection or a connection via a command network independent from the network 290. A configuration in which the network controller 210 executes network management software to automatically provide connection commands to the optical circuit switch 200 via an out-of-band communications link 215 is an example of what is commonly called a "software defined network".

Figure 3:
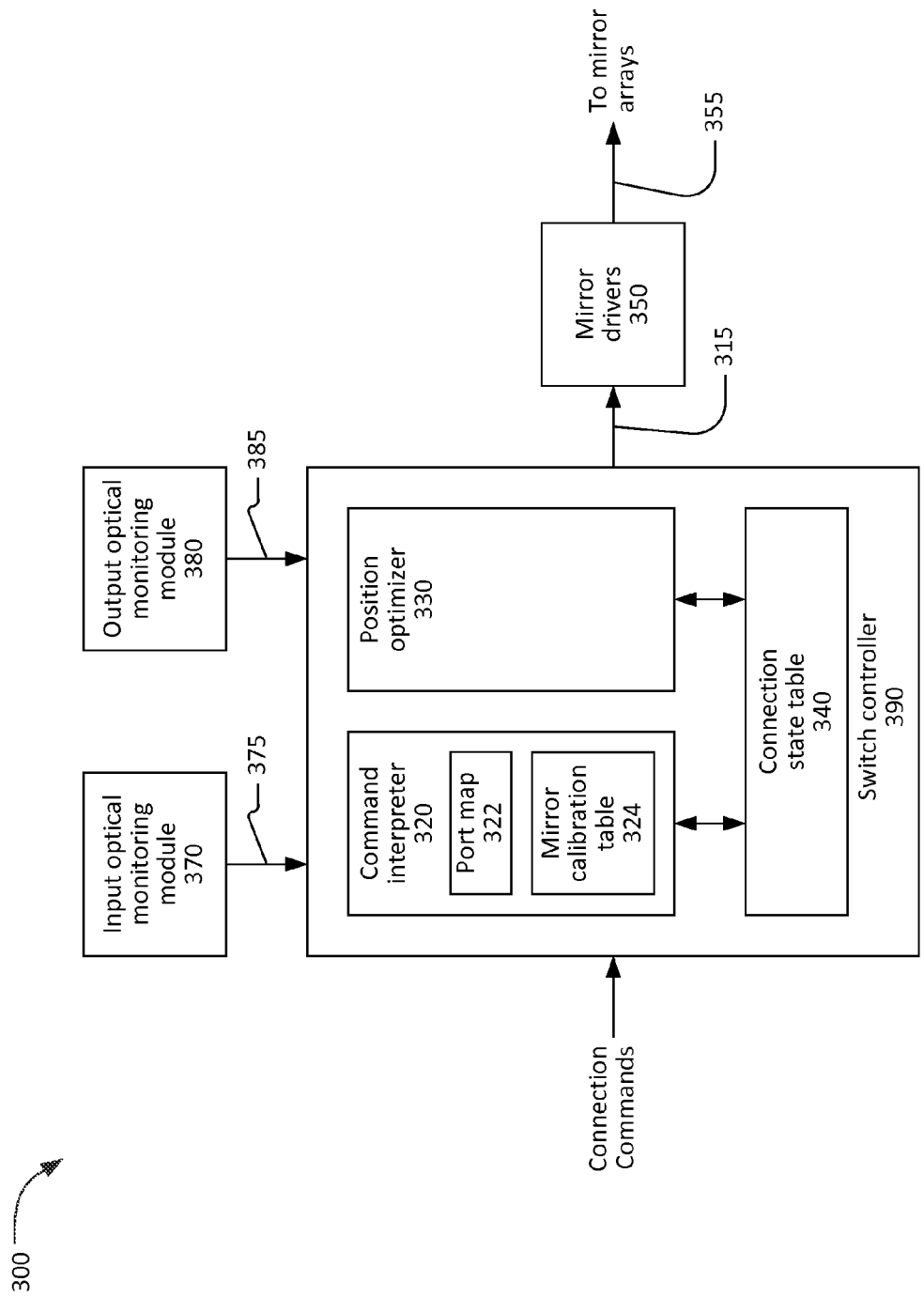
FIG. 3 is a block diagram of an optical circuit switch.

FIG. 3 is a high-level block diagram of the control and mirror driver portions of an optical circuit switch 300, which may be the optical circuit switch 100. The optical circuit switch 300 may include a switch controller 390, an input optical monitoring module 370, an output optical monitoring module 380, and a plurality of mirror driver circuits 350. The optical circuit switch 300 may include one mirror driver circuit 350 for each mirror in two mirror arrays if the individual mirror elements are rotatable about a single axis. The optical circuit switch 300 may include two mirror driver circuits 350 for each mirror in the mirror arrays if the individual mirror elements are rotatable about two orthogonal axes. Each mirror driver circuit 350 may have, for example, two selectable outputs to drive one or the other of a pair of electrodes, as described in pending patent application Ser. No. 13/787,621.

The switch controller 390 may include a command interpreter 320 and a position optimizer 330 which jointly maintain a connection state table 340. The switch controller 390 may receive connection commands from an external source such as the network controller 210. The switch controller 390 may receive connection commands from some other source or in some other manner.

The command interpreter 320 may be responsive to a set of connection commands received by the switch controller 390. The set of connection commands may include, for example "Break a-b" and "Make a-b". These commands may respectively instruct the optical circuit switch 300 to either break an existing connection between ports a and b (where a is an integer input number and b is an integer output number), or to make a new connection between ports a and b. The set of connection commands may include a mass connection command, which may list multiple connections to be made. The mass connection command may be used, for example, when the optical circuit switch is initially integrated into a network or when substantial reconfiguration of the network or data center is required.

The command interpreter 320 may include or have access to a port map 322. As previously described, to allow the use of mirror arrays with a small number of nonoperational mirror elements, the number of mirror elements in each mirror array may be larger than the number of inputs or outputs. Each input and output may be coupled to a known operational mirror element in the respective mirror array. The port map 322 may be a table containing data relating each input to a mirror element in a first mirror array, and data relating each output to a mirror element in a second mirror array. The data in the port map 322 may be specific to the particular first and second mirror arrays used in the optical circuit switch 300.

There may be some performance variation from mirror element to mirror element and/or from mirror array to mirror array. In particular, there may be some variation in the mirror element rotation angle versus applied voltage characteristics within and between mirror arrays. The command interpreter 320 may include or have access to a mirror calibration table 324 which contains data describing the performance of each mirror element. For example, the mirror calibration table 324 may store the rotation angle versus voltage characteristic of each mirror element. The mirror calibration table 324 may store, for all possible pairs of input and output mirror elements, a set of voltages that, when applied to the appropriate electrodes, will cause the mirror elements to rotate to make the desired connection. The data in the mirror calibration table 324 may be specific to the particular mirror arrays used in the optical circuit switch 300. The data in the mirror calibration table 324 may be derived, for example, from the results of tests performed on the particular mirror arrays used in the optical circuit switch 300.

The data stored in the mirror calibration table 324 may indicate nominal voltages required to initially make desired connections through the optical circuit switch 300. However, once voltages are applied to electrodes associated with a pair of input and output mirror elements to initially make a connection, the positions of the mirror elements may drift over time. The result of mirror element drift may be failure or degradation (e.g. increased insertion loss) of the connection. The mirror arrays used in the optical circuit switch 300 may be fabricated by chemical micromachining of a silicon substrate. For example, each mirror element may consist of a reflective coating on a silicon slab that is connected to the silicon substrate by narrow silicon elements that function as torsion bars. Each silicon mirror slab may be free to rotate about the axis or axes defined by the torsion bars. Mirror element drift may be due to mechanical stress relief of the torsion bars over time. Further, all or portions of the silicon surfaces of the mirror array may be coated with SiO2 or some other dielectric. Electric charge trapped at defects in the insulators layers may contribute to mirror element drift over time. Other causes may also contribute to mirror element drift.

The position optimizer 330 may receive data from the input optical monitoring module 370 and the output optical monitoring module 380 indicating the power levels at the inputs and the outputs, respectively. The position optimizer 330 may determine the insertion loss of each active optical connection (i.e. each optical connection where light is present) from the respective input and output power levels. The position optimizer 330 may periodically adjust the positions of some or all of the mirror elements to minimize the insertion loss of each optical connection. For example, to optimize a connection, the position optimizer 330 may make incremental changes in the position of one of the mirror elements used in the connection and observe the resulting effect on insertion loss. The optimum position of the mirror element may then be found using a hill climbing algorithm or a similar algorithm. The position of each mirror element may be optimized periodically. The time interval between successive optimizations of each mirror element may be short (on the order of seconds) compared to the time constant of the mirror element drift (on the order of hours). Periodic optimization of the position of each mirror element may automatically compensate for mirror element drift.

The command interpreter 320 and the position optimizer 330 may jointly maintain and share the connection state table 340. The connection state table 340 may include data indicative of the state or status of each port of the optical circuit switch 300. Data included in the connection state table 340 for each port may include a first flag indicating if the respective port is available or committed to a connection, and a second flag indicating if the connection has actually been made. The connection state table 340 may include, for inputs, a third flag indicating is light is present at the respective input. For each port that is committed to a connection, the connection state table 340 may also include the identity of the port at the other end of the connection, the mirror element associated with the port, the voltages presently applied to the electrodes associated with the mirror element, and temporal data such as when the connection was first made and when the position of the mirror element was most recently optimized.

Figure 4:
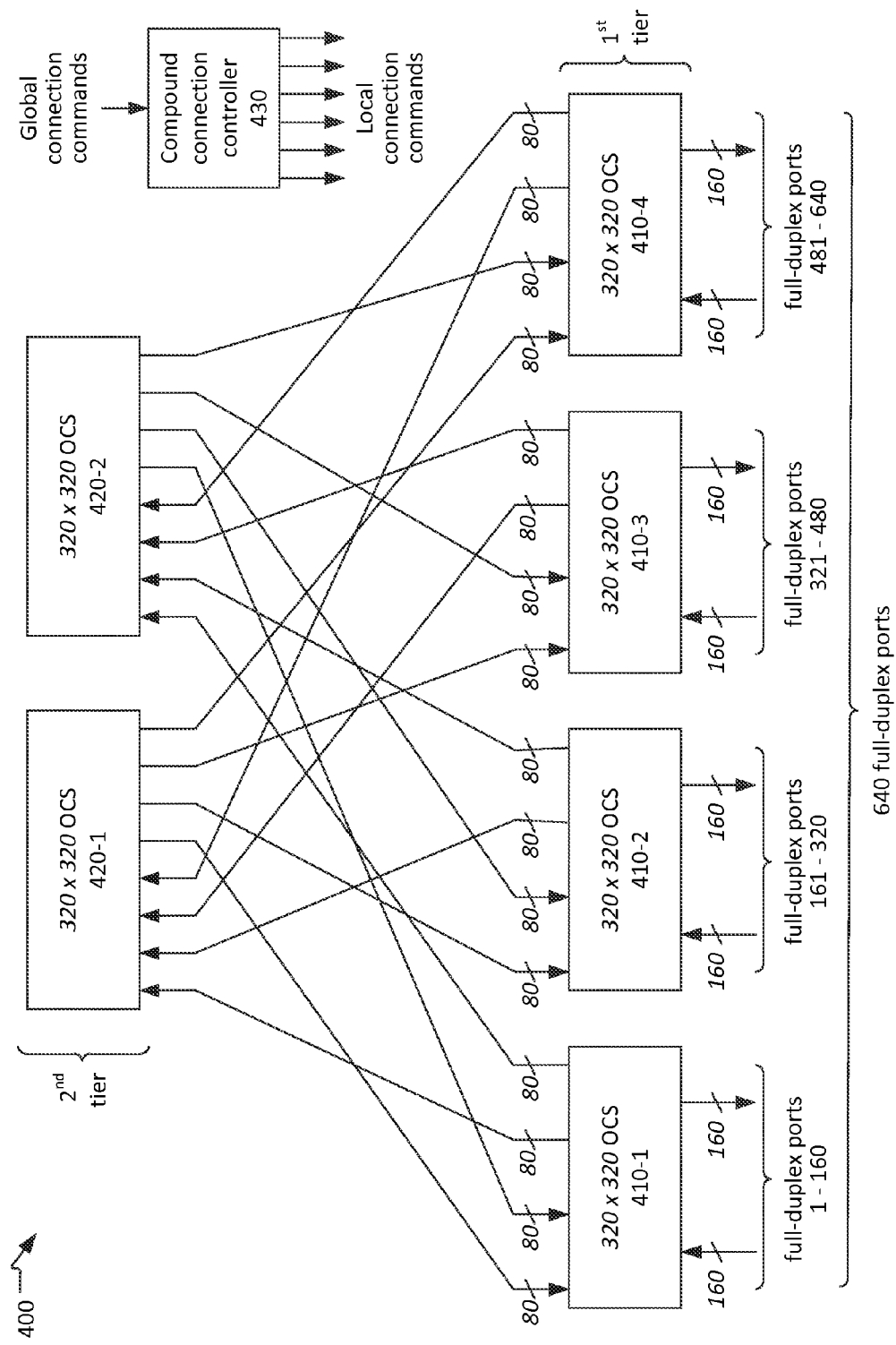
FIG. 4 is a block diagram of a compound optical circuit switch.

Referring now to FIG. 4, an exemplary compound optical circuit switch 400 may be capable of making a unidirectional connection between any of 640 input ports and any of 640 output ports. The 640 input ports and 640 output ports may be grouped in pairs to provide 640 full-duplex ports, as shown in FIG. 4. In this context, a full-duplex port is an input paired with an output to accommodate bidirectional communications. The compound optical circuit switch 400 may be capable of making a bidirectional connection between any one of 640 full-duplex ports to any other of the 640 full duplex ports. In this context, a full-duplex port is an input paired with an output to accommodate bidirectional communications. The compound optical circuit switch 400 may be fully non-blocking, which is to say a bidirectional connection between any two selected full-duplex ports can be made regardless of any possible combination of existing connections between other full-duplex ports.

The compound optical circuit switch 400 may include six optical circuit switches 410-1 to 410-4 and 420-1 to 420-2, each of which may be the optical circuit switch 100. Each of the optical circuit switches 410-1 to 410-4 and 420-1 to 420-2 may be configured to connect a group of 320 inputs to a group of 320 outputs. More specifically, each of the optical circuit switches 410-1 to 410-4 and 420-1 to 420-2 may selectively make up to 320 connections, where each connection conveys an optical signal from an input to an output. The choice of 320 input and outputs per optical circuit switch is exemplary, and the optical circuit switches 410-1 to 410-4 and 420-1 to 420-2 may have more or fewer inputs and outputs.

The six 320×320 optical circuit switches may be arranged as four $1^{st}$-tier switches 410-1, 410-2, 410-3, and 410-4 and two $2^{nd}$-tier switches 420-1, 420-2. The 640 full-duplex ports of the compound optical circuits switch 400 may be connected to respective input/output pairs of the $1^{st}$-tier optical circuit switches 410-1 to 410-4. Specifically 160 inputs and 160 outputs of each $1^{st}$-tier optical circuit switch may be connected respectively to 160 full-duplex ports. For example, the 160 inputs and 160 outputs of optical circuit switch 410-1 may be connected to full-duplex ports numbered from 1 to 160. Similarly, optical circuit switch 410-2 may be connected to full-duplex ports 161 to 320, optical circuit switch 410-3 may be connected to full-duplex ports 321 to 480, and optical circuit switch 410-4 may be connected to full-duplex ports 481 to 640. The full-duplex ports may be numbered in some other manner.

The other inputs and outputs of the $1^{st}$-tier optical circuit switches 410-1 to 410-4 may be connected to the $2^{nd}$-tier optical circuit switches 420-1 and 420-2. Specifically 80 outputs of each of the four $1^{st}$-tier optical circuit switches 410-1 to 410-4 may be connected to respective inputs of each of the $2^{nd}$-tier optical circuit switches 420-1, 420-2. 80 inputs of each of the four $1^{st}$-tier optical circuit switches 410-1 to 410-4 may be connected to respective outputs of each of the $2^{nd}$-tier optical circuit switches 420-1, 420-2.

Figure 5:
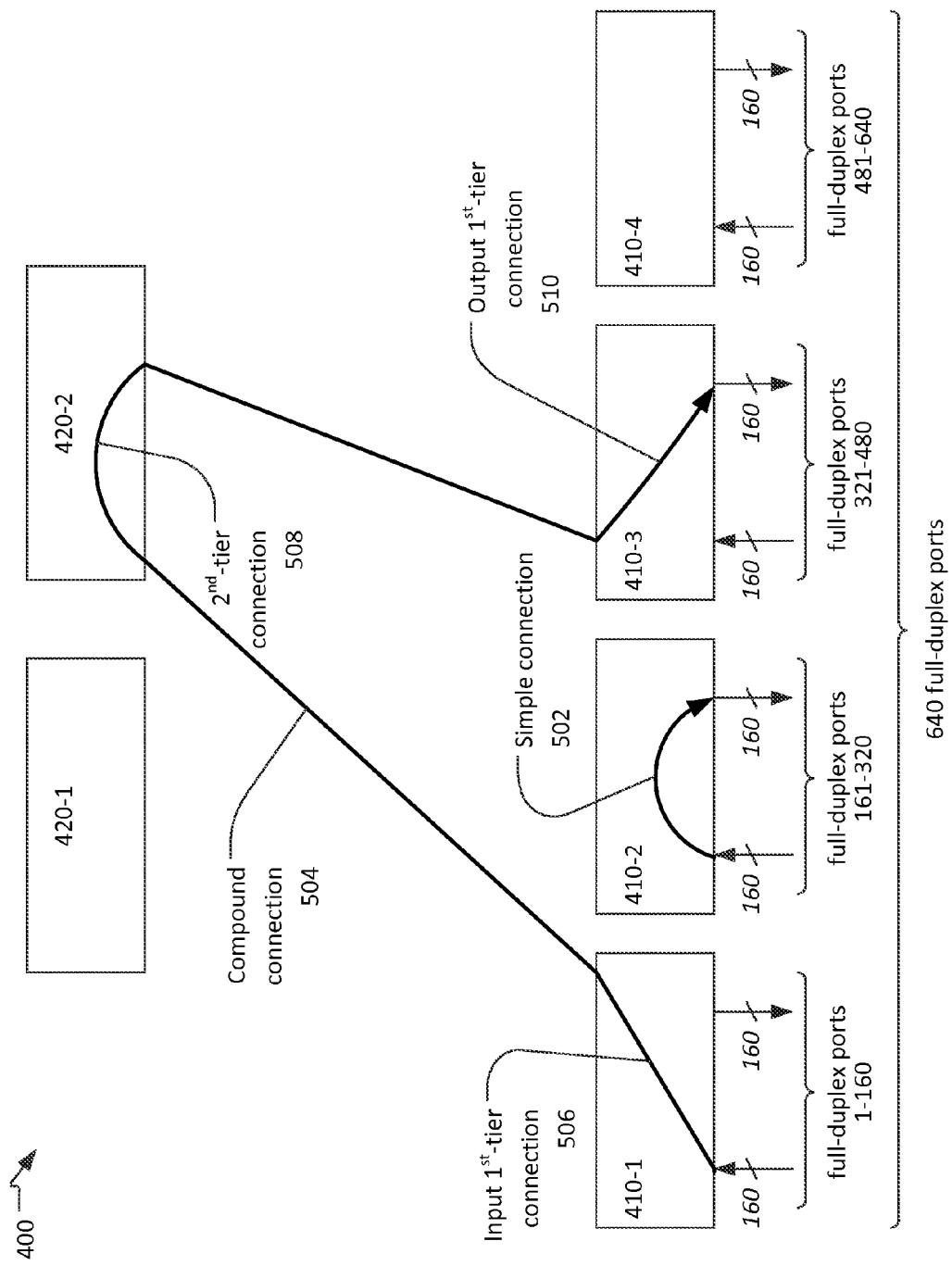
FIG. 5 is a block diagram of the compound optical circuit switch of FIG. 4 illustrating simple and compound connections.

Referring now to FIG. 5, connections between full-duplex ports provided on the same $1^{st}$-tier optical circuit switch may be made within the $1^{st}$-tier optical circuit switch. For example, a connection between two of the full duplex ports 161 to 320 can be made within the $1^{st}$-tier optical circuit switch 410-2, as illustrated by the arrow 502. Such connections will be referred to herein as "simple connections". A special case of a simple connection is when the input and output of a full duplex port are connected to each other to provide an optical loop-back. A loop-back connection may be useful during diagnostic testing of a network.

Connections between full-duplex ports provided by different $1^{st}$-tier optical circuit switches 410-1 to 410-4 may be made via one of the second tier optical circuit switches 420-1 and 420-2, as illustrated by the optical path 504. Such connections will be referred to herein as "compound connec-tions", where "compound" has its normal meaning of "composed of the union of several elements". Each compound connection includes connections through two different $1^{st}$-tier optical circuit switches and a connection through a $2^{nd}$-tier optical circuit switch. These connections will be referred to, in the direction of optical signal flow, an "input $1^{st}$ tier connection" 506, a "$2^{nd}$-tier connection" 508, and an "output $1^{st}$-tier connection" 510. The switches involved in a compound connection will be referred to, in the direction of optical signal flow, the input $1^{st}$-tier switch, the $2^{nd}$-tier switch, and the output $1^{st}$-tier switch.

Referring back to FIG. 4, the compound optical circuit switch 400 may include a compound connection controller 430 having primary responsibility for routing compound connections through compound optical circuit switch. The compound connection controller 430 may receive global connection commands from a network controller such as the network controller 210. In this context, a "global connection command" is a command directed to the compound optical circuit switch 400 as a whole, as opposed to a "local connection command" directed to one n×n optical circuit switch 410-1 to 410-4, 420-1, 420-2 within the compound optical circuit switch 400. Each global connection command may require one or more connections through the compound optical circuit switch 400 to be made and/or broken. When a received global connection command calls for a simple connection to be made or broken, the compound connection controller 430 may relay the global connection command as a local connection command to the appropriate $1^{st}$ tier optical circuit switch 410-1 to 410-4. When a received global connection command calls for a compound connection to be made or broken, the compound connection controller 430 may select a path through the compound optical circuit switch 400 and send individual local connection commands to the appropriate $1^{st}$-tier optical circuit switches 410-1 to 410-4 and the selected $2^{nd}$-tier optical circuit switch 420-1 or 420-2.

Figure 6:
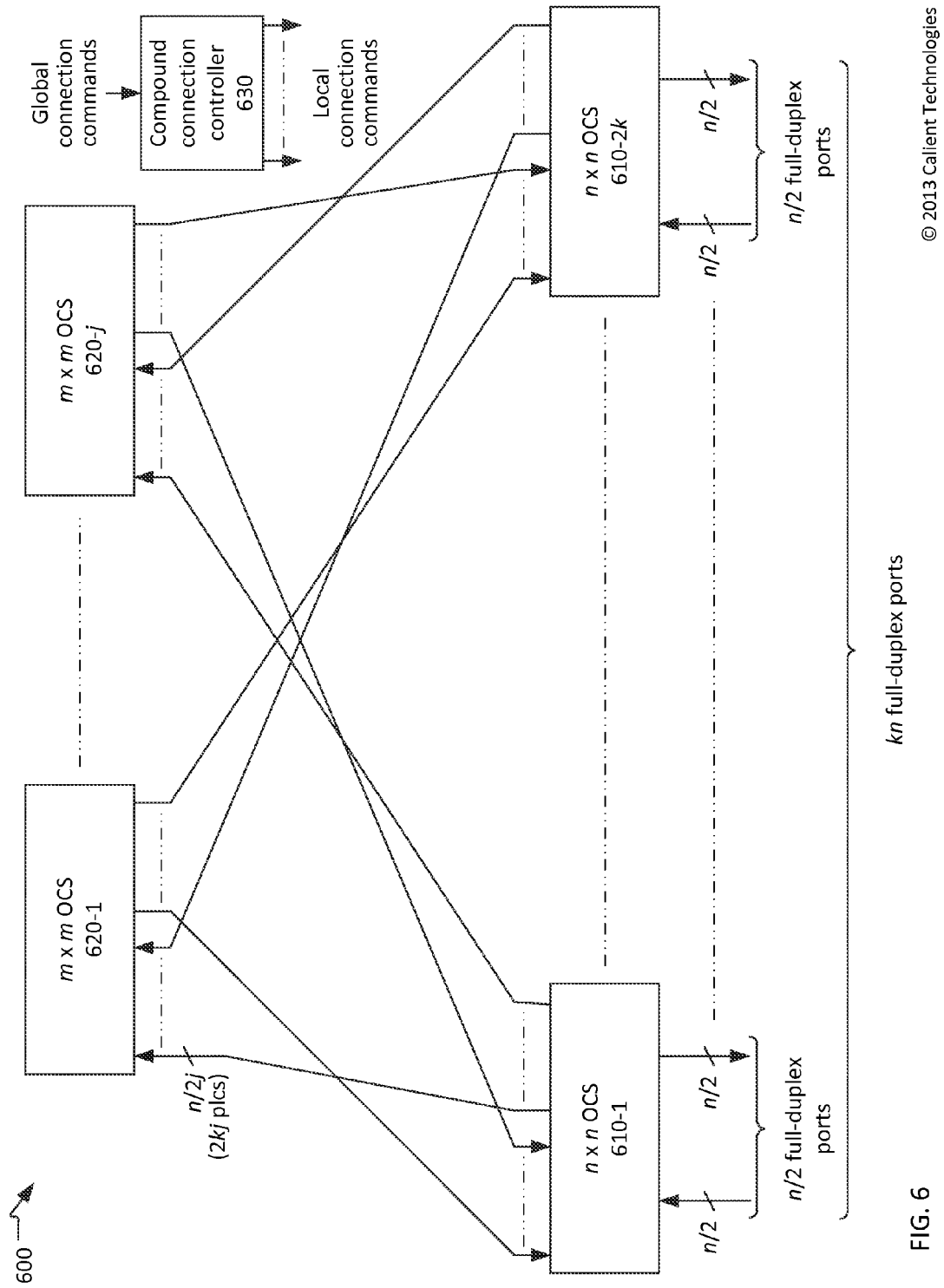
FIG. 6 is a block diagram of another compound optical circuit switch.

Referring now to FIG. 6, a generalized compound optical circuit switch 600 may be capable of making a unidirectional connection between any of kn input ports and any of kn output ports, where n is a number of inputs and outputs provided by an n×n optical circuit switch and k is an integer greater than one. The kn input ports and kn output ports may be grouped in pairs to provide kn full-duplex ports. The compound optical circuit switch 600 may be capable of making a bidirectional connection between any one of the kn full-duplex ports to any other of the kn full duplex ports. The compound optical circuit switch 600 may be fully non-blocking, which is to say a bidirectional connection between any two selected full-duplex ports can be made regardless of any possible combination of existing connections between other full-duplex ports.

The compound optical circuit switch 600 may include 2k n×n $1^{st}$-tier optical circuit switches. Each of the 2k n×n $1^{st}$-tier switches may be configured to connect a group of n inputs to a group of n outputs. Each of the 2k n×n $1^{st}$-tier switches may selectively make up to n connections, where each connection conveys an optical signal from an input to an output. The kn full-duplex ports of the compound optical circuit switch 600 may be connected to respective input/output pairs of the $1^{st}$-tier optical circuit switches 610-1 to 610-2k. Specifically n/2 inputs and n/2 outputs of each $1^{st}$-tier optical circuit switch may be paired to provide n/2 full-duplex ports.

The compound optical circuit switch 600 may include j m×m $2^{nd}$-tier optical circuit switches 620-1 to 620-j. Each of the j m×m $2^{nd}$-tier switches may be configured to connect a group of m inputs to a group of m outputs. Each of the j m×m $2^{nd}$-tier switches may selectively make up to m connections, where each connection conveys an optical signal from an input to an output.

The other inputs and outputs of the $1^{st}$-tier optical circuit switches 610-1 to 610-2k may be connected to the $2^{nd}$-tier optical circuit switches 620-1 and 620-j. Specifically n/2j outputs of each of the 2k $1^{st}$-tier optical circuit switches 610-1 to 610-2k may be connected to respective inputs of each of the $2^{nd}$-tier optical circuit switches 620-1, 620-j. n/2j inputs of each of the 2k $1^{st}$-tier optical circuit switches 610-1 to 610-2k may be connected to respective outputs of each of the $2^{nd}$-tier optical circuit switches 620-1, 620-j. In order for each input or output of a $1^{st}$-tier switch to be connected to a respective output or input of a $2^{nd}$-tier switch, the relationship kn=jm may be satisfied. The compound optical circuit switch 400 of FIG. 4 is an instantiation of the compound optical circuit switch 600 with n=m=320 and k=j=2. In other embodiments of the compound optical circuit switch 600, j, k, m, and n may have other values.

The compound optical circuit switch 600 may include a compound connection controller 630 having primary responsibility for routing compound connections through compound optical circuit switch. The compound connection controller 630 may receive global connection commands from a network controller such as the network controller 210. Each global connection command may require one or more connections through the compound optical circuit switch 600 to be made and/or broken. When a received global connection command calls for a simple connection to be made or broken, the compound connection controller 630 may simply relay the global connection command as a local connection command to the appropriate $1^{st}$ tier optical circuit switch 610-1 to 610-2k. When a received global connection command calls for a compound connection to be made or broken, the compound connection controller 630 may select a path through the compound optical circuit switch 600 and send individual local connection commands to the appropriate $1^{st}$-tier optical circuit switches 610-1 to 610-2k and the selected $2^{nd}$-tier optical circuit switch 620-1 to 620-j.

Briefly reviewing the description of FIG. 1, an optical circuit switch 100 may include tap couplers (of which only tap coupler 114-1 is identified) to direct a sample portion of each input signal to an input optical monitoring module 170 that measures an optical power level of each input. The optical circuit switch 100 may also include tap couplers (of which only tap coupler 154-1 is identified) to direct a sample portion of each output signal to an output optical monitoring module 180 that measures an optical power level of each output. A controller 190 may control the position of mirrors within mirror arrays 130, 140 to optimize each connection through the optical circuit switch 100 based on the respective input and output power measurements.

However, in an compound optical circuit switch such as the compound optical circuit switch 600, every input to a $2^{nd}$-tier switch 620-1 to 620-j comes from an output of one of the $1^{st}$-tier switches 610-1 to 610-2k. Thus, ignoring possible losses in the fiber optic connections between the $1^{st}$-tier and $2^{nd}$-tier switches, the input power levels at the inputs of the $2^{nd}$-tier switches will be the same as the output power levels at the outputs of the $1^{st}$-tier switches. Thus it is not necessary for a compound optical circuit switch to include both output power monitoring in the $1^{st}$-tier switches and input power monitoring in the $2^{nd}$-tier switches. Similarly, every output from a $2^{nd}$-tier switch 620-1 to 620-j goes to an input of one of the $1^{st}$-tier switches 610-1 to 610-2k. Thus it is not necessary for a compound optical circuit switch to include both output power monitoring in the $2^{nd}$-tier switches and input power monitoring in the $1^{st}$-tier switches. Power monitoring in the $1^{st}$-tier switches alone will perform the functions for both the $2^{nd}$-tier and $1^{st}$-tier switches because all connections, both simple and compound, must pass through at least one of the $1^{st}$-tier switches.

Figure 7:
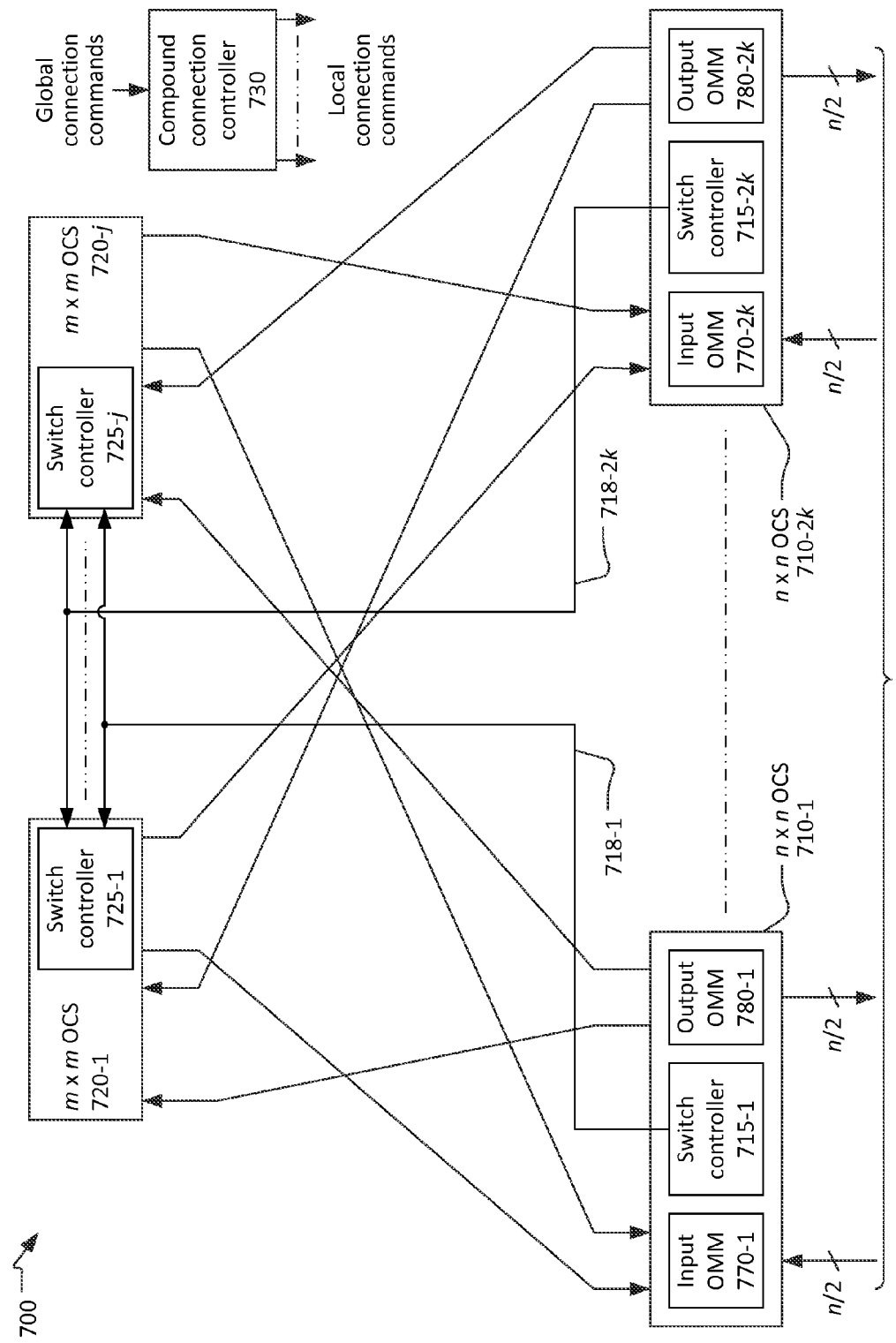
FIG. 7 is a block diagram of another compound optical circuit switch.

Referring now to FIG. 7, another compound optical circuit switch 700 may be capable of making a bidirectional connection between any one of kn full-duplex ports to any other of the kn full duplex ports, where n is a number of inputs and outputs provided by an n×n optical circuit switch and k is an integer greater than zero. The compound optical circuit switch 700 may include 2k first-tier switches 710-1 to 710-2k and j second-tier switches 720-1 to 720-j The $1^{st}$-tier and $2^{nd}$-tier switches may be interconnected as described with respect to FIG. 6. The compound optical circuit switch 700 may include a compound connection controller 730 having primary responsibility for routing compound connections through compound optical circuit switch as previously described.

Each $1^{st}$-tier switch 710-1 to 710-2k may include tap couplers on each input and output and respective input optical monitoring modules 770-1 to 770-2k and output optical monitoring modules 780-1 to 780-2k. Each $2^{nd}$-tier switch 720-1 to 720-j may not include taps couplers or optical monitoring modules. Instead, the respective switch controllers 725-1 to 725-j of the $2^{nd}$-tier switches may receive power measurement data 718-1 to 718-2k from the respective switch controllers 715-1 to 715-2k of the $1^{st}$ tier switches. Power measurement data 718-1 to 718-2k may be communicated from the $1^{st}$-tier switches to the $2^{nd}$-tier switches via multiple dedicated connections (as shown) or via one or more shared bus or network. For example, the $1^{st}$-tier switches 710-1 to 710-2k may transmit power measurement data in rotation over a shared bus or network. Each $1^{st}$-tier switch may transmit power measurement data for all inputs and outputs, or only those inputs and outputs connected to one of the $2^{nd}$-tier switches 720-1 to 720-j. Each $2^{nd}$-tier switch (or the switch controllers 725-1 to 725-j or the compound connection controller 730) may have knowledge of the interconnections between the $1^{st}$-tier switches and each $2^{nd}$-tier switch but power measurement data may only be captured for only the $1^{st}$-tier inputs and outputs to which it is actually connected.

Figure 8:
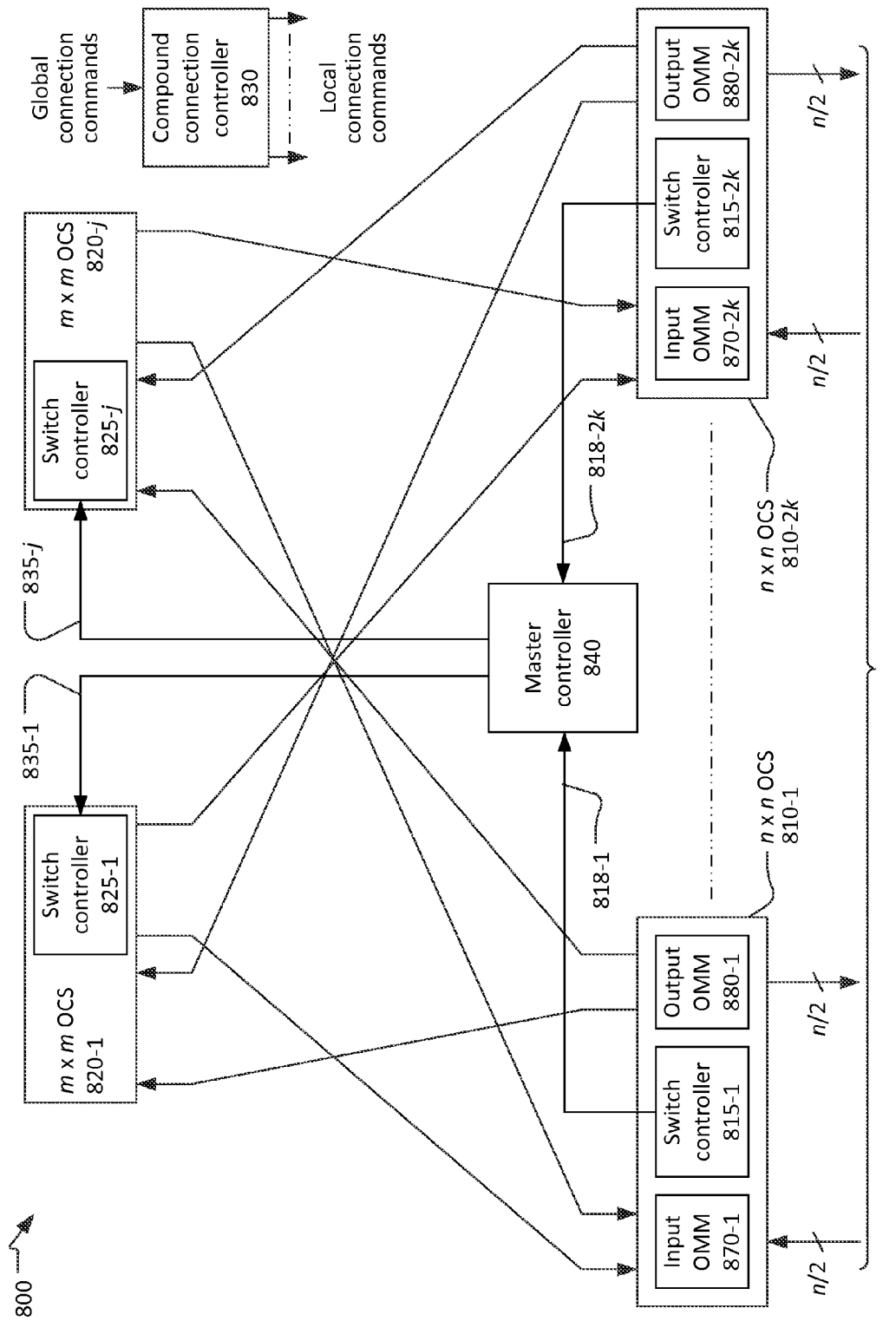
FIG. 8 is a block diagram of another compound optical circuit switch.

Referring now to FIG. 8, another compound optical circuit switch 800 may be capable of making a bidirectional connection between any one of kn full-duplex ports to any other of the kn full-duplex ports, where n is a number of inputs and outputs provided by an n×n optical circuit switch and k is an integer greater than zero. The compound optical circuit switch 800 may include 2k first-tier switches 810-1 to 810-2k and j second-tier switches 820-1 to 820-k. The $1^{st}$-tier and $2^{nd}$-tier switches may be interconnected as described with respect to FIG. 6. The compound optical circuit switch 800 may include a compound connection controller 830 having primary responsibility for routing compound connections through compound optical circuit switch as previously described.

Each $1^{st}$-tier switch 810-1 to 810-2k may include tap couplers on each input and output and respective input optical monitoring modules 870-1 to 870-2k and output optical monitoring modules 880-1 to 880-2k. Each $2^{nd}$-tier switch 820-1 to 820-j may not include taps couplers or optical monitoring modules. Instead, the respective switch controllers 815-1 to 815-2k of the $1^{st}$-tier switches may provide power measurement data 818-1 to 818-2k to a master controller 840. The master controller 840 may be a separate computing device, or may be integrated with the compound connection controller 830 or one of the switch controllers 815-1 to 815-

2k or 825-1 to 825-j. Power measurement data 718-1 to 718-2k may be communicated from the $1^{st}$-tier switches to the master controller 840 via multiple dedicated connections (as shown) or via one or more shared bus or network. The master controller may be knowledgeable of the interconnections between the $1^{st}$-tier and $2^{nd}$-tier switches. The master controller 840 may distribute the appropriate power measurement data 835-1 to 835-j to each $2^{nd}$-tier switch 820-1 to 820-j. The master controller 840 may also coordinate optimization of compound connections between the $1^{st}$-tier and $2^{nd}$-tier switches.

Figure 9:
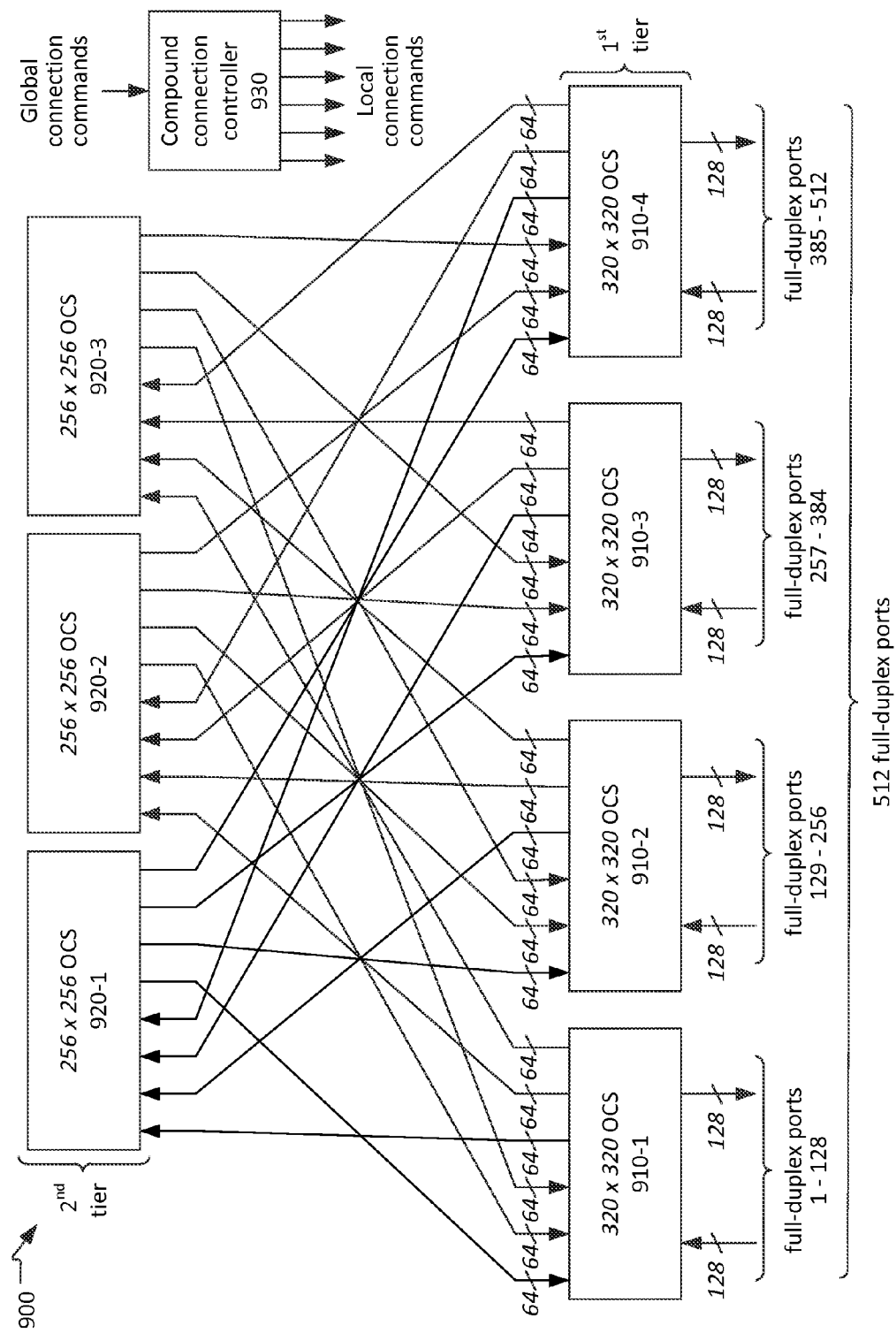
FIG. 9 is a block diagram of another compound optical circuit switch.

Referring now to FIG. 9, another compound optical circuit switch 900 may be capable of making a bidirectional connection between any one of 512 full-duplex ports to any other of the 512 full duplex ports. The compound optical circuit switch 900, like the compound optical circuit switch 400 of FIG. 4, may include four first-tier switches 910-1 to 910-4, each of which can make half-duplex connections between 320 input and output ports. Unlike the compound optical circuit switch 400, 128 input and output ports of each $1^{st}$-tier switch 910-1 to 910-4 are used to provide a total of 512 full duplex ports of the compound optical circuit switch. 192 input and output ports of each $1^{st}$-tier switch 910-1 to 910-4 are connected to three second-tier switches 920-1 to 920-3. The addition of a third $2^{nd}$-tier switch provides redundancy such that all possible full-duplex connections through the compound optical circuit switch 900 can be made even in the event of a complete failure of one of the $2^{nd}$ tier switches 920-1 to 920-3. Redundancy is provided at the expense of a reduction in the number of full duplex ports (512 as opposed 640 for the compound optical circuit switch 400) and the addition of the third $2^{nd}$-tier switch. Redundancy may be provided in higher port count compound optical circuits switches by incorporating at least one redundant $2^{nd}$-tier switch connected to input and output ports of each $1^{st}$-tier switch.

Description of Processes

Figure 10:
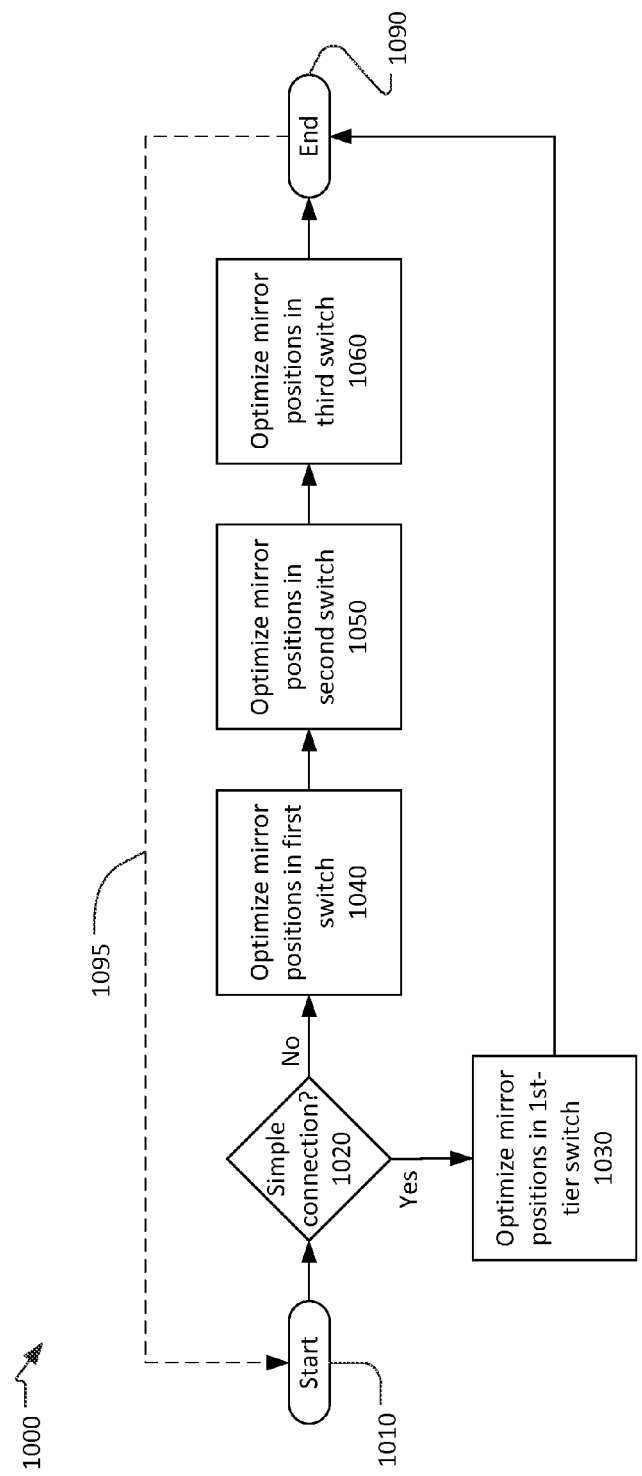
FIG. 10 is a flow chart of a process for optimizing a connection through a compound optical circuit switch.

FIG. 10 is a flow chart of a process 1000 for optimizing a connection through a compound optical circuit switch such as the compound optical circuit switches 400, 600, 700, and 800. The process 1000 may start at 1011 and end at 1090 after a single unidirectional connection has been optimized. Although the process 1000 is not inherently cyclic, the process 1000 may be repeated periodically, as indicated by the dashed arrow 1095, to re-optimize the connection to correct for factors such as mirror element drift and/or temperature changes.

Multiple instantiations of the process 1000 may proceed sequentially and/or concurrently to optimize a large number of connections through the compound optical circuit switch. Note that two instantiations of the process 1000 are required to optimize both directions of a full-duplex simple connection. For example, the compound optical circuit switch 400 of FIG. 4 can provide full-duplex connections between 640 full-duplex ports, which is equivalent to 640 unidirectional connections between individual inputs and outputs. The compound optical circuit switch 400 may run up to 640 instantiations of the process 1000 to optimize all connections. The compound optical circuit switches 600, 700, and 800 may run up to kn instantiations of the process 1000.

At 1020 a determination may be made whether or not the connection to be optimized is a simple connection (see, e.g., simple connection 520 in FIG. 5). When the connection to be optimized is a simple connection ("yes" at 1020), the connection is made through a single $1^{st}$-tier switch. In this case, the mirror positions in the $1^{st}$-tier switch may be optimized at 1030 using a local search optimization technique. For example, a hill climbing algorithm may be used to optimize the mirror position. A mirror position may be incrementally changed and a determination may be made if the position change improved or degraded the insertion loss of the connection through the switch. Successive incremental changes may be made until an optimum mirror position is determined. Sequential hill-climbing algorithms may be performed for each of two rotation axes and two mirror elements for each connection. After the positions of both mirror elements on both axes have been optimized, the process 1000 may end at 1090.

When a determination is made at 1020 that the connection is not a simple connection ("no" at 1020), the connection must be, by default, a compound connection through two $1^{st}$-tier switches and a $2^{nd}$-tier switch. In this case, the mirror positions within the three switches may be optimized sequentially at 1040, 1050, and 1060 using hill climbing or other optimization algorithms as previously described. Sequential optimization is necessary to avoid the ambiguity that would inherently occur if hill climbing algorithms were run simultaneously on multiple mirror elements along the same connection. The order in which the mirror positions in the three switches are optimized is unimportant, so long as the mirror positions in only one switch are being optimized at any given time. After the mirror positions within the three switches have been optimized, the process 1000 may end at 1090.

The process 1000 may be supervised by a master controller such as the master controller 840 in the compound optical circuit switch 800. The master controller may control the sequence 1040, 1050, 1060 in which $1^{st}$-tier and $2^{nd}$-tier switch optimize connections. For example, for each compound connection, the master controller may authorize a first switch to optimize mirror positions at 1040. After receiving confirmation from the first switch that its optimization has been completed, the master controller may authorize the second switch to optimize mirror positions at 1050 and, subsequently, the third switch to optimize mirror positions at 1060. The master controller may also determine how often the process 1000 should be repeated (dashed arrow 1095).

Figure 11:
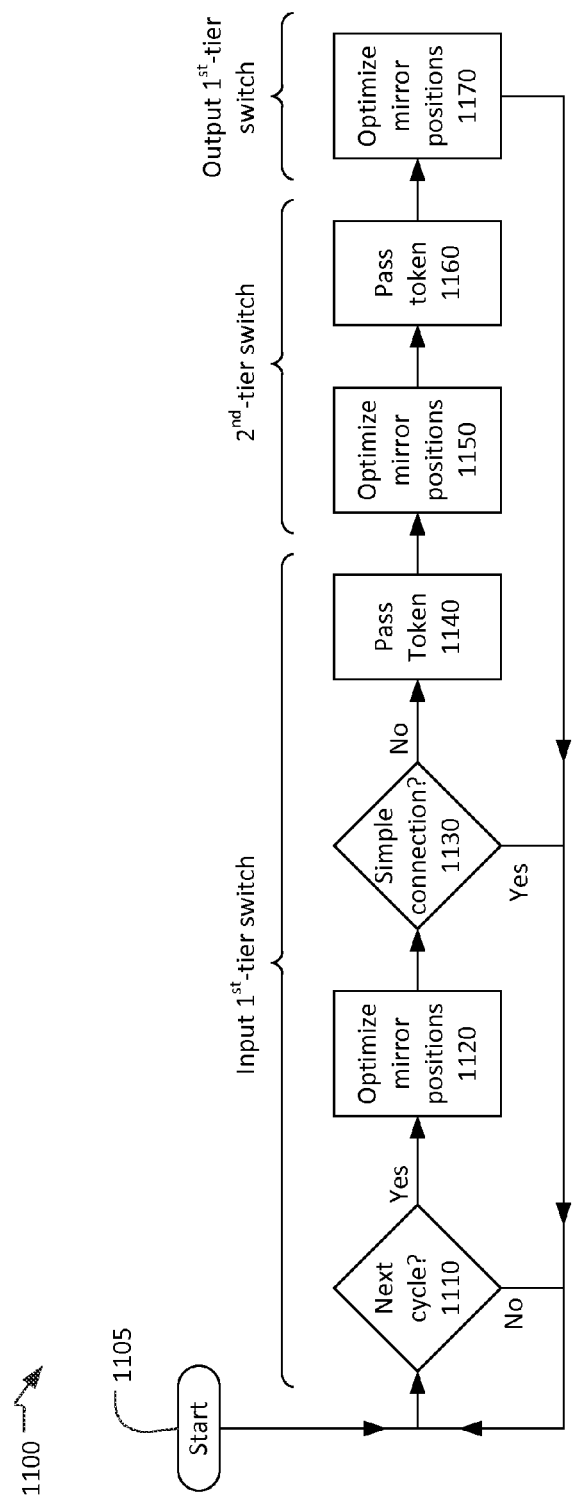
FIG. 11 is a flow chart of another process for optimizing a connection through a compound optical circuit switch.

FIG. 11 is a flow chart of another process 1100 for optimizing a connection through a compound optical circuit switch that does not include a master controller, such as the compound optical circuit switches 400, 600, and 700. The process 1100 may start at 1105 when a first connection is made through the compound optical circuit switch and may continue perpetually so long as the compound optical circuit switch is in service. The process 1100 is inherently cyclic, and will repeat periodically to re-optimize the connection to correct for factors such as mirror element drift and/or temperature changes.

Multiple instantiations of the process 1100 may proceed sequentially and/or concurrently to optimize a large number of connections through the compound optical circuit switch. Note that two instantiations of the process 1100 are required to optimize both directions of a full-duplex simple connection. For example, the compound optical circuit switch 400 of FIG. 4 can provide full-duplex connections between 640 full-duplex ports, which is equivalent to 640 unidirectional connections between individual inputs and outputs. The compound optical circuit switch 400 may run up to 640 instantiations of the process 1100 to optimize all connections. The compound optical circuit switches 600 and 700 may run up to kn instantiations of the process 1100.

As shown in FIG. 11, the process 1100 is controlled by the input $1^{st}$-tier switch for each connection. An alternate version of the process 1100 may be controlled by the output $1^{st}$-tier switch of each connection.

At 1110, the input $1^{st}$-tier switch may determine whether or not it is time to start a next optimization cycle. This determination may be based, for example, by a hardware or software timer that initiates an optimization cycle at periodic intervals. It the determination is made that it is not yet time to begin a new cycle ("no" at 1110) the process 1100 may idle at 1110.

When a determination is made at 1110 to initiate a new optimization cycle, the positions of mirrors within the input $1^{st}$-tier switch may be optimized at 1120 using a local search optimization technique. For example, a hill climbing algorithm may be used to optimize the mirror position. A mirror position may be incrementally changed and a determination may be made if the position change improved or degraded the insertion loss of the connection through the switch. Successive incremental changes may be made until an optimum mirror position is determined. Sequential hill-climbing algorithms may be performed for each of two rotation axes and two mirror elements for each connection.

After the positions of both mirror elements on both axes have been optimized at 1120, a determination may be made at 1130 whether or not the connection is a simple connection. When the connection is a simple connection ("yes" at 1130), the connection is completed within the input $1^{st}$-tier switch (which is inherently also the output $1^{st}$-tier switch). Thus the optimization performed at 1120 optimizes the entire simple connection. In this case, the process 1100 may return to 1110 to await the start of the next cycle.

When a determination is made at 1130 that the connection is not a simple connection ("no" at 1130), the connection must be, by default, a compound connection through two $1^{st}$-tier switches and a $2^{nd}$-tier switch. In this case, at 1140, the input $1^{st}$-tier switch may pass a token to the appropriate $2^{nd}$-tier switch. The token may be passed, for example, using the same bus, network, or other communications path used to pass power measurements from the $1^{st}$-tier switches to the $2^{nd}$-tier switches.

Upon receipt of the token, the $2^{nd}$-tier switch may optimize the positions of the appropriate mirrors at 1150. When complete, the $2^{nd}$-tier switch may pass the token to the appropriate output $1^{st}$ tier switch at 1160. Upon receipt of the token, the output $1^{st}$-tier switch may optimize the positions of the appropriate mirrors at 1170 to complete the optimization of the entire compound connection. The process 1105 may then return to 1110 to await the next optimization cycle.

Figure 12:
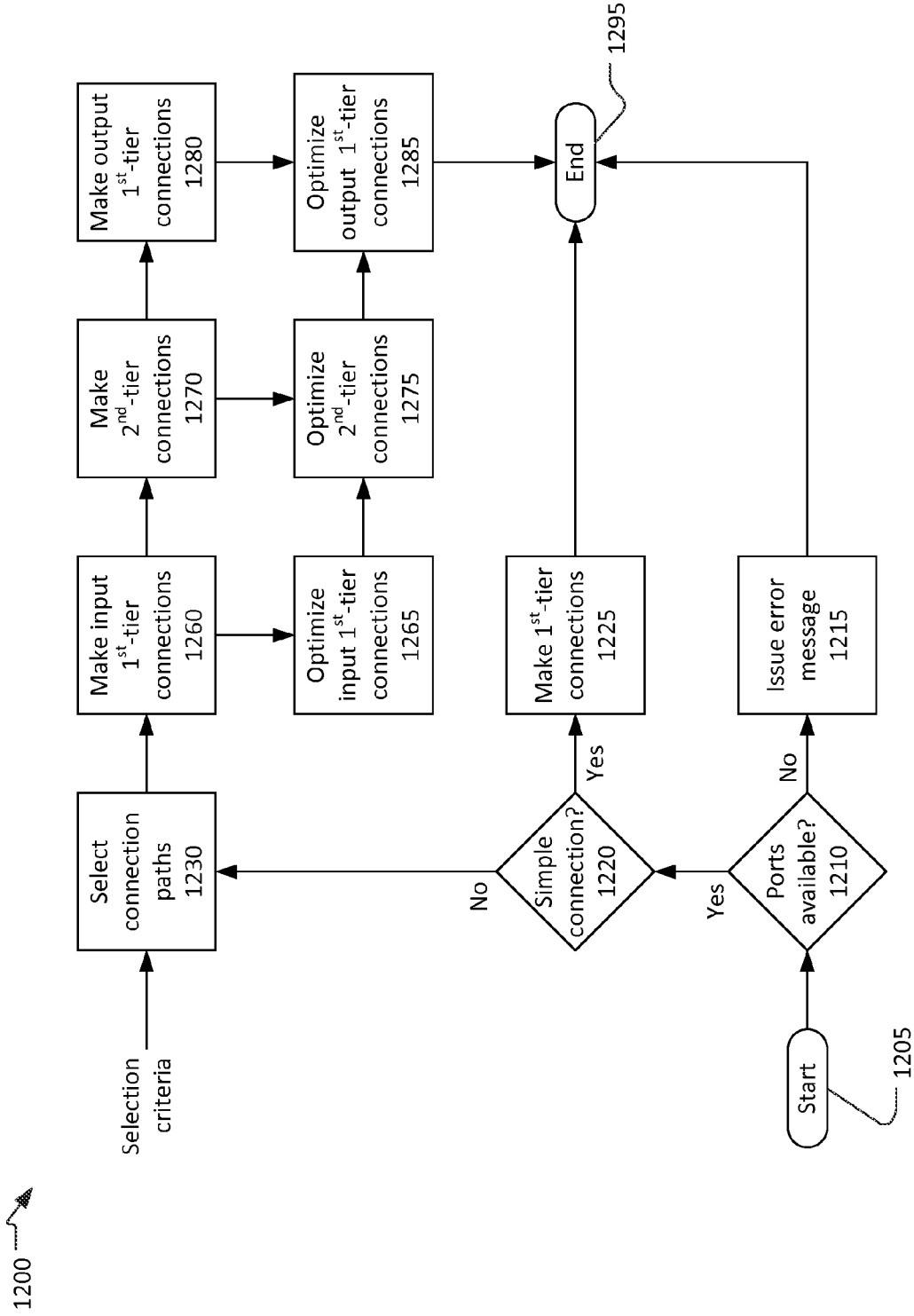
FIG. 12 is a flow chart of a process for making a connection through a compound optical circuit switch.

FIG. 12 is a flow chart of a process 1200 for making a full-duplex connection through a compound optical circuit switch, such as the compound optical circuit switches 400, 600, 700, and 800. The process 1200 may start at 1205 when a command to make a connection between to designated ports is received by the compound optical circuit switch. The command may be received, for example, from a network controller such as the network controller 210. The process 1200 may end at 1295 after a single full-duplex (bidirectional) connection has been made. The process 1200 may be repeated each time a new connection is made through the compound optical circuit switch.

At 1210, a determination may be made whether or not the two ports to be connected are available, which is to say the two ports to be connected are not already used in a prior connection. If one or both of the two ports is used in an existing connection and thus not available ("no" at 1210), an error message may be issued to the network controller at 1220 and the process 1200 may end at 1295. If a determination is made that the two ports are available ("yes" at 1210), the process 1200 may proceed to 1220. The actions at 1210 and 1215 are optional and in some compound optical circuit switches, the process 1200 may proceed immediate to 1220 from the start at 1205.

At 1220, a determination may be made whether or not the connection to be optimized is a simple connection. When the connection to be optimized is a simple connection ("yes" at 1220), the connection can be made through a single $1^{st}$-tier switch. In this case, the connection may be made through the appropriate $1^{st}$-tier switch at 1225 and the process 1200 may end at 1295.

When a determination is made at 1220 that the connection is not a simple connection ("no" at 1220), the connection must be, by default, a compound connection through two $1^{st}$-tier switches and a $2^{nd}$-tier switch. In this case, connection paths for each direction of the full-duplex connection may be selected from among the available paths at 1230. For example, when the first connection made though the compound optical circuit switch 400 is a compound connection, 80 different paths will be available from the input 1st-tier switch to either of the $2^{nd}$-tier switches, and 80 different paths will be available from the selected $2^{nd}$-tier switch to the output $1^{st}$-tier switch, for a total of 2×80×80=12,800 different possible routings for the connection. At the other extreme, after 639 connections have been made, only a single connection path will be available for the $640^{th}$ connection. The paths between the $1^{st}$-tier and $2^{nd}$-tier switches may be selected at 1250 sequentially, randomly, or in some other manner. The bidirectional paths of a full-duplex connection may commonly, but not necessarily be routed through the same $2^{nd}$-tier switch.

Particular connection paths for each direction of the full-duplex connection may be selected from among the available paths at 1230 randomly, or in a predetermined order, or based on one or more selection criteria. For example, a preferred $2^{nd}$-tier switch may be specified in the command received at 1205. The various $1^{st}$-tier and $2^{nd}$-tier switches making up a compound optical circuit switch are not necessarily co-located. The $1^{st}$-tier and $2^{nd}$-tier switches of a compound optical circuit switch may be physically distributed between multiple equipment racks, multiple buildings, and even multiple cities. When the $1^{st}$-tier and $2^{nd}$-tier switches of a compound optical circuit switch are physically distributed, a selection criteria applied at 1230 may be to minimize the physical distance of the paths. Minimizing the physical distance of the paths may, for example, lower the probability of the connection being lost due to a cable failure. Different physical and logical security levels may be imposed on different $1^{st}$-tier and $2^{nd}$-tier switches making up a compound optical circuit switch. In this case, a selection criteria applied at 1230 may be to ensure a particular security level as defined in the command received at 1205. Other criteria may be used at 1230 to select particular paths from a plurality of available paths. When multiple selection criteria are applied to a full duplex connection, priorities or weights may be assigned to the selection criteria.

After the connections paths have been selected at 1230, the input $1^{st}$ tier switch may be instructed to make the input $1^{st}$-tier connections at 1260. Making a connection in an optical circuit switch may require an extended period of time (for example tens or hundreds of milliseconds) since the mirror elements may be moved gradually to avoid mechanical overshoot, ringing, and possible damage. Making the input $1^{st}$-tier connections at 1260 allows the input $1^{st}$-tier connections be optimized at 1265 (assuming light is present at the inputs to the connections) without having to wait for the movement of the mirrors in the $2^{nd}$-tier switch and the output $1^{st}$-tier switch.

The $2^{nd}$-tier connections may be made at 1270, concurrent with the optimization of the input $1^{st}$-tier connection at 1265. The $2^{nd}$-tier connections may be optimized at 1275 after the optimization of the input $1^{st}$-tier connections at 1265 is complete. The output $1^{st}$-tier connections may be made last at 1280, which may be concurrent with the optimization of the input $1^{st}$-tier connection at 1265 or optimization of the $2^{nd}$-tier connection at 1275. The output $1^{st}$-tier connections may be optimized at 1285 after the optimization of the $2^{nd}$-tier connections at 1275 is complete. The process 1200 may then end at 1295.

Portions of the process 1200 may be performed and/or supervised by a compound connection controller such as the compound connection controllers 430, 630, 730 and 830. The compound connection controller may receive connection commands at 1205, determine if the ports are available at 1200 and issue error messages at 1205. When a simple connection is made, the compound connection controller may relay the connection command to the appropriate $1^{st}$-tier switch to make the connection at 1225. When a compound connection is made, the compound connection controller may select the connection path at 1230 and provide local commands to the appropriate $1^{st}$-tier and $2^{nd}$-tier switches to make the connection at 1260-1285.

Optical signals routed through optical circuit switch will suffer insertion loss due to small, but cumulative, losses at the movable mirrors, collimating and focusing lenses, optical fibers, tap couplers, and other components of the optical circuit switch. Further, minor variations in these components may result in variations in the expected insertion loss (i.e. the insertion loss after mirror positions are optimized) of different connections through an optical circuit switch. The variations in insertion loss can be exaggerated in a compound optical circuit switch since each compound connection consists of three optical circuit switch connections in series. Excessive cumulative insertion loss over an optical communications path may result in low signal-to-noise ratio of the received optical signal which may, in turn, cause increased bit error rate. Network controllers, such as the network controller 210, may strive to limit the cumulative insertion loss in each optical communications path. To this end, a network controller may establish a loss budget for each communication path, which may include an insertion loss target for some or all connections through optical circuit switched.

Figure 13:
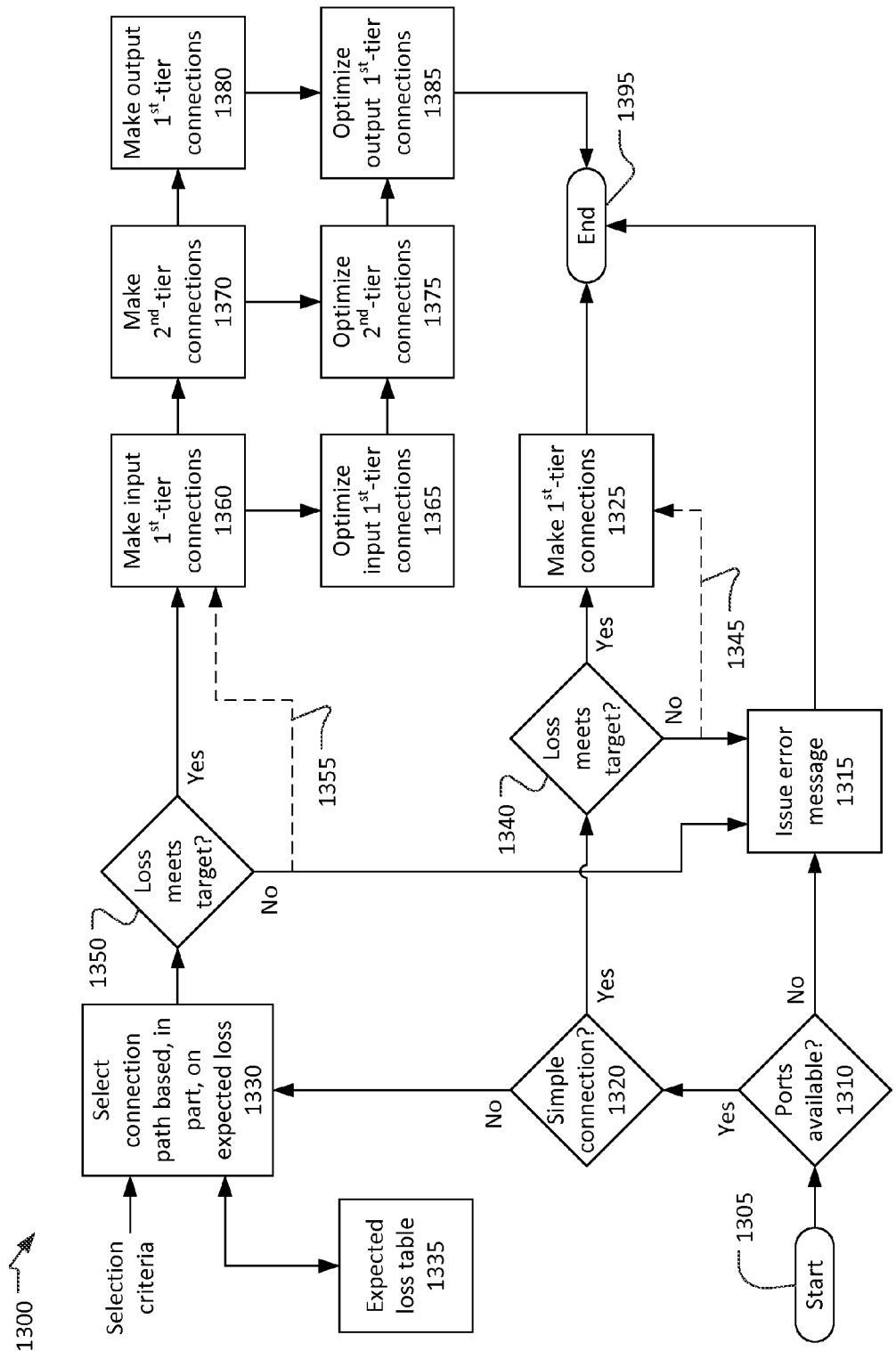
FIG. 13 is a flow chart of another process for making a connection through a compound optical circuits switch.

FIG. 13 is a flow chart of another process 1300 for making a full-duplex connection through a compound optical circuit switch, such as the compound optical circuit switches 400, 600, 700, and 800. The process 1300 is similar to the process 1200, except that the process 1300 considers expected insertion loss when making connections and, in particular, when selecting paths for compound connections. To this end, an expected loss for every possible connection through each of the $1^{st}$-tier and $2^{nd}$-tier switches may be stored in an expected loss table 1335. The data in the expected loss table may be derived, for example, from manufacturer's test data on each of the optical circuit switches.

The process 1300 may start at 1305 when a command to make a connection is received by the compound optical circuit switch. The actions 1310 to 1325 and 1360 to 1385 in the process 1300 are essentially identical to the counterpart actions in the process 1200. Complete descriptions of similar actions will not be repeated. The process 1300 may end at 1395 after a single full-duplex (bidirectional) connection has been made.

The command received at 1315 may be provided, for example, by a network controller such as the network controller 210. The command may identify a pair of full-duplex ports to be connected. The command may optionally include data indicating a respective insertion loss target for the connection to be made. For example, the command received at 1305 may specify a maximum acceptable insertion loss for the connection. The command received at 1305 may include a flag or other data indicating the connection should be made with the minimum possible insertion loss. The command may include a flag or other data indicating that the connection can tolerate relatively high insertion loss. The command received at 1305 may include data specifying an insertion loss target in some other manner.

When a determination is made at 1320 that a simple connection will be made, there will be only a single possible optical path for the connection within the appropriate one of the $1^{st}$-tier switches. If the command received at 1305 included a loss target for this connection, an expected loss of the connection may be retrieved from the expected loss table 1335. The expected loss and the loss target may be compared and a determination may be made at 1340 whether or not the expected loss satisfies the loss target. When the loss target is satisfied ("yes" at 1340) the connection may be made at 1325 and the process 1300 may end at 1395.

When a determination is made at 1340 that the loss target will not be satisfied ("no" at 1340), a message to that effect may be issued at 1315, and the process 1300 may end at 1395. Alternatively, the connection may be made anyway (for example when no alternative connection paths are available) at 1325, as indicated by the dashed line 1345.

When a determination is made at 1320 that a compound connection is required ("no" at 1320), a connection path for the compound connection may be selected at 1330. In most circumstances, multiple (possibly hundreds) of alternative connection paths may be available to make a particular compound connection. Each connection path consists of an input $1^{st}$-tier connection, a $2^{nd}$-tier connection, and an output $1^{st}$-tier connection. When multiple connection paths are available, the selection of a particular connection path at 1330 may be based on selection criteria as previously described. When multiple selection criteria are applied to a full duplex connection, priorities or weights may be assigned to the selection criteria.

One selection criteria that may be applied at 1330 is a loss target for the connection. For example, if the loss target is to make the connection with the minimum possible insertion loss, the expected loss table 1335 may be searched for the available path having the lowest insertion loss. If the loss target is expressed as a maximum allowed loss level, the expected loss table 1335 may be searched for the first available with an insertions loss lower than the target level. If the loss target indicates that the connection can tolerate high loss, the expected loss table 1335 may be searched for the available path having the highest insertion loss (to preserve lower insertion loss connections). The connection path may be selected at 1330 is some other manner.

At expected loss of the selected connection path and the loss target may be compared and a determination may be made at 1350 whether or not the expected loss satisfies the loss target. When the loss target is satisfied ("yes" at 1350) the connection may be made at 1360-1385 as previously described. The process 1300 may then end at 1395.

When a determination is made at 1350 that the loss target will not be satisfied ("no" at 1350), a message to that effect may be issued at 1315, and the process 1300 may end at 1395. Alternatively, the connection may be made anyway (for example, when no alternative connection path is available) at 1360-1385, as indicated by the dashed line 1355.

In the absence of a loss target for a compound connection, or as an alternative to the use of loss targets altogether, the connections paths for compound connections may be selected at 1330 to attempt to equalize the insertion loss of all compound connections. To this end, the insertion loss of each compound connection may be set, to the extent possible, equal to the average expected insertion loss of a compound connection. At 1330, the connection path may be selected in accordance with the formula $$IL1in + IL2 + IL1out \approx 2IL1av + IL2av \quad (1)$$

where IL1in, IL2, and IL1out are the insertion losses (from the expected loss table 1335) of the selected connections through the input $1^{st}$-tier switch, the selected $2^{nd}$-tier switch, and the output $1^{st}$-tier switch respectively; IL1av and IL2av are the average insertion losses of connections through $1^{st}$-tier and $2^{nd}$-tier switches, respectively; and the symbol $\approx$ has its normal meaning of "almost equal to".

Portions of the process 1300 may be performed and/or supervised by a compound connection controller such as the compound connection controllers 430, 630, 730 and 830. The compound connection controller may include the expected loss table 1335. The compound connection controller may receive connection commands at 1315, determine if the ports are available at 1310 and issue error messages at 1315. When a simple connection is made, the compound connection controller may determine if the connection will meet a lost target at 1340 and relay the connection command to the appropriate $1^{st}$-tier switch to make the connection at 1325. When a compound connection is made, the compound connection controller may select the connection path at 1330, determine if a loss target is satisfied at 1350, and provide local commands to the appropriate $1^{st}$-tier and $2^{nd}$-tier switches to make the connection at 1360-1385.

Figure 14:
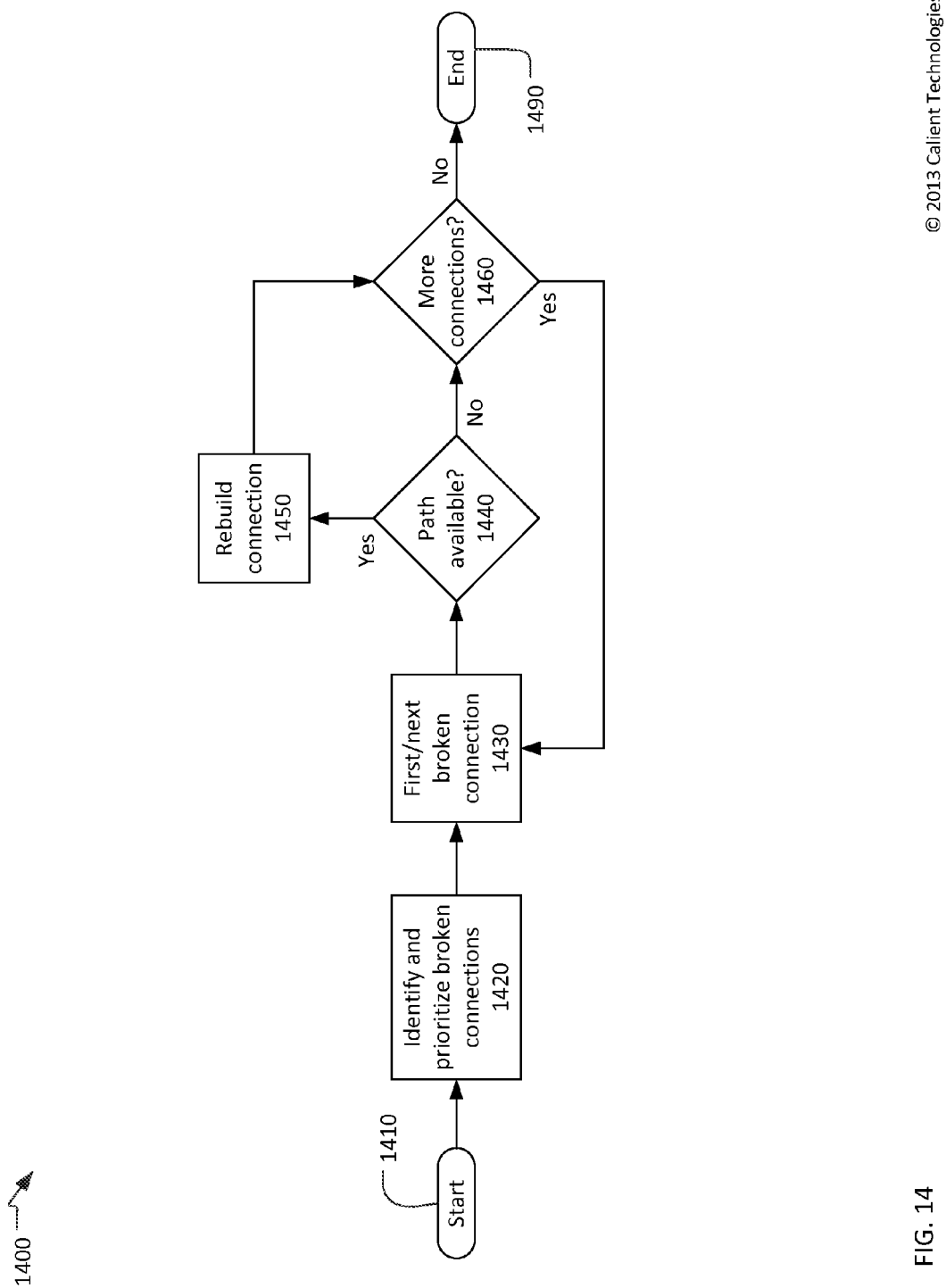
FIG. 14 is a flow chart of a process for rebuilding connections through a compound optical circuit switch.

FIG. 14 is a flow chart of a process 1400 for rebuilding full-duplex compound connections through a compound optical circuit switch, such as the compound optical circuit switches 400, 600, 700, 800, and 900 in the event of a failure of a 2nd-tier switch. The process 1400 may start at 1410 when an alarm or other indication is received indicating failure of a $2^{nd}$ tier switch within the compound optical circuit switch. The alarm may be generated with the compound optical circuit switch or may be surmised from externally generated information such as the disruption of a plurality of connections made through the failed $2^{nd}$-tier switch. The process 1400 may end at 1490 when the connections broken by the failure of the $2^{nd}$-tier switch have be rebuilt to the extent possible.

At 1420, the compound connections broken by the failure of the $2^{nd}$-tier switch may be identified and, optionally, prioritized. For example, a compound connection controller (e.g. 430, 630, 730, 830, 930) within the compound optical circuit switch may maintain or table or list of the compound connections made through the compound optical circuit switch. This table may be parsed to identify connections made using the failed $2^{nd}$-tier switch.

In general, an optical circuit switch is oblivious to the content communicated over connections made through the switch. Thus an optical circuit switch may be unable, of itself, to prioritize connections for rebuilding. However, priority information may be included in commands received by the optical circuit switch and may be stored in the table of connections. Priority information may also be provided, for example by a network controller such as the network controller 210, at the time the failure of the $2^{nd}$-tier switch is recognized. The priority information may be used at 1420 to prioritize an order in which broken connections will be rebuilt. When priority information is not available, the compound connections to be rebuilt may be placed in random order or any convenient order.

Each broken compound connection may be rebuilt in sequence from 1430 to 1460. At 1430 a first broken compound connection may be selected in accordance with the order determined at 1420. At 1440, a determination may be made whether or not a path is available to rebuild the selected connection. Each broken full duplex compound connection connects an input/output port pair at a first $1^{st}$-tier switch with an input/output port pair at a second $1^{st}$-tier switch. Since the two directions of the full duplex compound connection did not necessarily pass through the same $2^{nd}$ tier switch, one or both of the directions of the full duplex compound connection may need to be rebuilt. In order to rebuild a connection, it is necessary that a path is available between the first and second $1^{st}$-tier switches via one of the working $2^{nd}$ tier switches.

In a compound optical circuit switch without redundancy, such as the compound optical circuit switches 400, 600, 700, and 800, paths to rebuild broken compound connections will be available only to the extent that some ports of other $2^{nd}$-tier switches were unused prior to the failure of the failed $2^{nd}$-tier switch. If a path is available to rebuild the compound connection identified at 1430, the connection may be rebuilt at 1450. Rebuilding the compound connection at 1450 may include issuing local connection commands to the appropriate $1^{st}$-tier and $2^{nd}$-tier switches to make and optimize the necessary connections, such as described in conjunction with actions 1260-1285 of the process 1200.

In a compound optical circuit switch with redundancy, such as the compound optical circuit switch 900, a path to rebuild any broken compound connection is guaranteed. In such a compound optical circuit switch, the determination at 1440 is unnecessary and the connection selected at 1430 may be rebuilt at 1450.

After one or both directions of a compound connection are rebuilt at 1450, or when a determination is made at 1440 that no path is available, the process 1400 may proceed to 1460. At 1460, a determination may be made if there are more broken compound connections that may possibly be rebuilt. When one or more broken compound connections are identified, the process 1400 may return to 1430 to select the next broken compound connection. The actions from 1430 to 1460 may be repeated until all broken compound connections have been considered. When all broken compound connections have been considered ("No" at 1460), the process may end at 1490.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A compound optical circuit switch to provide selectable optical connections between a plurality of input ports and a plurality of output ports, comprising:
   two or more $1^{st}$-tier switches, each of the plurality of input ports connected to a respective input of one of the $1^{st}$-tier switches, and each of the plurality of output ports connected to a respective output of one of the $1^{st}$-tier switches;
   one or more $2^{nd}$-tier switches coupled to the $1^{st}$-tier switches; and
   a compound connection controller configured to:
      receive a global connection command identifying an input port from the plurality of input ports and an output port from the plurality of output ports to be connected through the compound switch;
      when the identified input port and the identified output port are connected to the same $1^{st}$-tier switch, issue a local command to that $1^{st}$-tier switch to effect a simple connection between the identified input port and the identified output port, or
      when the identified input port and the identified output port are connected to different $1^{st}$-tier switches,
         select a connection path from the identified input port to the identified output port through the $1^{st}$-tier switch connected to the identified input port, 1 selected $2^{nd}$-tier switch, and the $1^{st}$-tier switch connected to the identified output port, the connection path selected based, in part, on an expected insertion loss of the connection path, and
         issue local commands to the $1^{st}$-tier switch connected to the identified input port, the selected $2^{nd}$-tier switch, and the $1^{st}$-tier switch connected to the identified output port to effect a compound connection along the selected connection path.

2. The compound optical circuit switch of claim 1, wherein the compound connection controller comprises:
   an expected loss table storing an expected insertion loss for at least some of the possible connections between an input and an output of each of $1^{st}$-tier switches and each of the $2^{nd}$-tier switches.

3. The compound optical circuit switch of claim 2, wherein the compound connection controller is further configured to:
   select the connection path from the input port to the output port based, in part, on a insertion loss target included in the global connection command.

4. The compound optical circuit switch of claim 2, wherein the compound connection controller is further configured to:
   select the connection path from the input port to the output port to equalize, to an extent possible, insertion losses of all compound connections.

5. The compound optical circuit switch of claim 4, wherein the compound connection controller is further configured to:
   select an available connection path having an insertion loss that is most nearly equal to an average expected insertion loss for all compound connections.

6. A method of making connection through a compound optical circuit switch including two or more $1^{st}$-tier switches and one or more $2^{nd}$-tier switches, the method comprising:
   receiving a global connection command identifying an input port from a plurality of input ports and an output port from a plurality of output ports to be connected;
   when the identified input port and the identified output port are connected to the same $1^{st}$-tier switch, making a simple connection within the $1^{st}$-tier switch; and
   when the identified input port and the identified output port are connected to two different $1^{st}$-tier switches,
      selecting a connection path from the input port to the output port through the $1^{st}$-tier switch connected to the identified input port, a selected $2^{nd}$-tier switch, and the $1^{st}$-tier switch connected to the identified output port, the selecting based, in part, on an expected insertion loss of the connection path, and
      making a compound connection along the selected connection path.

7. The method of claim 6, further comprising:
   when the identified input port and the identified output port are connected to the same $1^{st}$-tier switch, issuing a local command to that $1^{st}$-tier switch to effect the simple connection between the identified input port and the identified output port, or
   when the identified input port and the identified output port are connected to different $1^{st}$-tier switches, issuing local commands to the $1^{st}$-tier switch connected to the identified input port, the selected $2^{nd}$-tier switch, and the $1^{st}$-tier switch connected to the identified output port to effect the compound connection.

8. The method of claim 6, further comprising:
   storing an expected insertion loss for at least some of the possible connections between an input and an output of each of $1^{st}$-tier switches and each of the $2^{nd}$-tier switches in an expected loss table.

9. The method of claim 8, wherein selecting the connection path further comprises:
   selecting the connection path from the input port to the output port based, in part, on an insertion loss target included in the global connection command and the expected loss table.

10. The method of claim 8, wherein selecting the connection path further comprises:
   selecting the connection path from the input port to the output port based on the expect loss table to equalize, to extent possible, insertion losses of all compound connections.

11. The method of claim 10, wherein selecting the connection path further comprises:
   selecting an available connection path having an insertion loss that is most nearly equal to an average expected insertion loss for all compound connections.

\* \* \* \* \*